(12) United States Patent
Lientz et al.

(10) Patent No.: US 9,747,592 B2
(45) Date of Patent: Aug. 29, 2017

(54) END-TO-END CONTENT DELIVERY NETWORK INCORPORATING INDEPENDENTLY OPERATED TRANSPARENT CACHES AND PROXY CACHES

(75) Inventors: Andrew Lientz, Culver City, CA (US); Alexander A. Kazerani, Santa Monica, CA (US); James Segil, Santa Monica, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 1308 days.

(21) Appl. No.: 13/541,605

(22) Filed: Jul. 3, 2012

(65) Prior Publication Data

US 2013/0046883 A1    Feb. 21, 2013

Related U.S. Application Data

(63) Continuation-in-part of application No. 13/401,721, filed on Feb. 21, 2012, now abandoned.

(60) Provisional application No. 61/524,294, filed on Aug. 16, 2011.

(51) Int. Cl.
| | |
|---|---|
| *G06Q 20/14* | (2012.01) |
| *G06F 15/167* | (2006.01) |
| *H04L 12/24* | (2006.01) |
| *G06F 17/30* | (2006.01) |

(Continued)

(52) U.S. Cl.
CPC ......... *G06Q 20/145* (2013.01); *G06F 15/167* (2013.01); *G06F 17/30035* (2013.01); *G06F 17/30545* (2013.01); *G06F 17/30566* (2013.01); *G06F 17/30902* (2013.01); *H04L 41/0816* (2013.01); *H04L 65/105* (2013.01);

(Continued)

(58) Field of Classification Search
None
See application file for complete search history.

(56) References Cited

U.S. PATENT DOCUMENTS

| | | | | |
|---|---|---|---|---|
| 5,892,900 | A * | 4/1999 | Ginter | G06Q 20/12 |
| | | | | 726/26 |
| 6,266,401 | B1 * | 7/2001 | Marchbanks | G06Q 30/04 |
| | | | | 379/114.05 |

(Continued)

*Primary Examiner* — Calvin L Hewitt, II
*Assistant Examiner* — Eduardo Castilho
(74) *Attorney, Agent, or Firm* — Los Angeles Patent Group; Arman Katiraei

(57) ABSTRACT

Some embodiments provide an end-to-end federated CDN solution that assimilates a transparent caching server that is operated by a transparent caching server operator into a CDN that independently operates CDN caching servers. Specifically, the logs from the transparent caching server are assimilated into the CDN by aggregating the logs from the transparent caching server and processing the transparent caching server logs to identify network usage for content of a CDN content provider customer that is delivered by the transparent caching server. The network usage is then combined with the network usage that tracked by the CDN caching servers in order to provide comprehensive report metrics for the content provider customer and to bill the content provider customer for all network usage related to delivering the content provider customer's content irrespective of whether the content was delivered by a transparent caching server or a CDN caching server.

15 Claims, 12 Drawing Sheets

(51) Int. Cl.
   *H04L 29/06*   (2006.01)
   *H04L 29/08*   (2006.01)
(52) U.S. Cl.
   CPC .......... *H04L 67/22* (2013.01); *H04L 67/2819* (2013.01); *H04L 67/2842* (2013.01)

(56) References Cited

U.S. PATENT DOCUMENTS

| | | | | |
|---|---|---|---|---|
| 7,010,578 B1* | 3/2006 | Lewin | ............... | G06F 17/30905 709/217 |
| 8,397,073 B1* | 3/2013 | Richardson | ......... | H04L 67/1097 713/150 |
| 8,626,876 B1* | 1/2014 | Kokal | ............... | H04L 67/06 709/203 |
| 8,799,674 B1* | 8/2014 | Leighton | ............... | G06F 21/602 726/6 |
| 9,137,301 B1* | 9/2015 | Dunlap | ............... | H04L 67/101 |
| 2007/0168517 A1* | 7/2007 | Weller | ............... | G06Q 40/04 709/226 |
| 2010/0088505 A1* | 4/2010 | Coppola | ............... | G06F 21/6218 713/153 |
| 2010/0121940 A1* | 5/2010 | Reeser | ............... | G06F 17/30902 709/219 |
| 2010/0306368 A1* | 12/2010 | Gagliardi | ............... | G06F 17/30864 709/224 |
| 2012/0089700 A1* | 4/2012 | Safruti | ............... | H04L 67/2842 709/217 |
| 2012/0096106 A1* | 4/2012 | Blumofe | ............... | G06Q 50/00 709/213 |
| 2012/0209942 A1* | 8/2012 | Zehavi | ............... | H04L 29/08729 709/213 |
| 2013/0007186 A1* | 1/2013 | Liu | ............... | H04L 67/1008 709/213 |
| 2013/0229918 A1* | 9/2013 | Ludwig | ............... | H04W 28/0268 370/230 |

* cited by examiner

END-TO-END CONTENT DELIVERY NETWORK INCORPORATING INDEPENDENTLY OPERATED TRANSPARENT CACHES AND PROXY CACHES

CLAIM OF BENEFIT TO RELATED APPLICATIONS

This application is a continuation-in-part of U.S. nonprovisional application Ser. No. 13/401,721, entitled "End-to-End Content Delivery Network Incorporating Independently Operated Transparent Caches and Proxy Caches", filed Feb. 21, 2012 which claims the benefit of U.S. provisional application 61/524,294, entitled "Open Content Delivery Network Platform with Capacity Exchange", filed Aug. 16, 2011. The contents of application Ser. Nos. 13/401,721 and 61/524,294 are hereby incorporated by reference.

TECHNICAL FIELD

The present invention relates to content caching and content delivery networks.

BACKGROUND ART

Content delivery networks (CDNs) have greatly improved the transfer of content across data networks such as the Internet. One way that a CDN improves the transfer of content is to reduce the distance that content travels in order to reach a destination. To do so, the CDN operator strategically locates surrogate origin servers, also referred to as CDN caching servers or edge servers, at various points-of-presence (PoPs) that are geographically proximate to large numbers of end users. CDN customers are content providers that offload their content to the CDN caching servers. The CDN caching servers cache the offloaded content and deliver the content on behalf of the CDN customers or content providers. More particularly, from the geographically proximate locations of the CDN caching servers to the end users, the CDN caching servers serve the cached content to end users in a manner that is more efficient than if the content providers were to serve the content themselves. The CDN uses a traffic management system to route requests for the cached content to the CDN caching server that can optimally deliver the requested content to the requesting end user. As used hereafter, optimal delivery of content refers to the most efficient available means by which content can be delivered from a server to an end user machine over a data network. Optimal delivery of content may be quantified in terms of latency, jitter, packet loss, distance, and overall end user experience.

Determination of the optimal CDN caching server may be based on geographic proximity to the requesting end user as well as other factors such as load, capacity, and responsiveness of the CDN caching servers. The optimal CDN caching server delivers the requested content to the requesting end user in a manner that is more efficient than when origin servers of the content provider (CDN customer) deliver the requested content or when other CDN caching servers at different PoPs of the CDN deliver the content. For example, a CDN operator may deploy CDN caching servers to form PoPs in Los Angeles, Dallas, and New York. These caching servers may cache content that is published by a particular content provider customer who has an origin server in Miami. When a requesting end user in San Francisco submits a request for the content of the particular content provider customer, the CDN will deliver the content from a CDN caching server at the Los Angeles PoP on behalf of the particular content provider customer, as opposed to the much greater distance that would be required when delivering the content from the particular content provider customer's origin server in Miami. In this manner, the CDN reduces the latency, jitter, and amount of buffering that is experienced by the requesting end user.

Another advantage of the CDN is that it allows content provider customers to offload infrastructure costs, configuration management, and maintenance to the CDN. The CDN operator deploys and manages the infrastructure for the delivery network and the CDN operator allocates as much resources as needed to a particular content provider customer at a given time, with the ability for the particular content provider customer to rapidly scale resources as needed. Content provider customers only pay the CDN operator for the resources (e.g., bandwidth) that are used to serve the content provider customer's content from any of the CDN's PoPs to whichever end users request that content. Content provider customers can therefore devote more time to the creation of content and less time to the creation of an infrastructure that delivers the content to end users. As a result of these and other benefits, many CDNs are in operation today. Edgecast, Akamai, Limelight, and CDNetworks are some examples of currently operating CDNs.

A problem confronting any CDN operator is the inability to provide a true end-to-end content delivery solution. This is because the CDN operator does not control all links in the delivery chain over which content is delivered from one of its CDN caching servers to an end user. Specifically, the CDN operator does not have control over one or more of the final links in the delivery chain. This discontinuity in the delivery chain is primarily a result of the Telcos that are positioned between the CDN and the end users. A Telco means and refers to a wireless or mobile service provider, broadband service provider, or any internet service provider (ISP). Telcos may be regional or national service providers and may include service providers such as AT&T®, Verizon® and Charter Communications®. A Telco provides one or more end users connectivity to data networks, including the Internet. Such connectivity enables the communication between the CDN caching servers and the end users. The Telco fully controls the components and the network that enable such connectivity. As a result, a CDN operator is typically unable to locate its caching servers inside the Telco network, when the Telco wishes to maintain full control of its network. End users that are customers of a particular Telco, pay the Telco for access to the data network. Payment may be in the form of monthly subscription fees or pay-per-increment of bandwidth usage. This payment in turn pays for the cost of connecting the Telco network to other data networks, thereby providing end users of the Telco access to the Internet.

A Telco interrupts the end-to-end delivery capability of the CDN when it deploys one or more transparent caching servers or proxy servers within the Telco-controlled network. Typically, the Telco deploys such servers at gateway locations, whereby content passing between the Telco network and an external data network flows at some point through the transparent caching server or proxy server. The terms transparent caching server will be used hereafter to refer to the functionality of either a transparent caching server or a proxy server. As is known to one of ordinary skill in the art, a transparent caching server is functionally different and is operated independent of the CDN caching servers. A transparent caching server can be configured by the Telco to specify certain content that the Telco wishes to designate as hot (i.e., popular) content, whereas the CDN caching servers are configured to cache content based on rules configured by the CDN operator or rules provided by their content provider customers. In further contrast to the CDN caching servers, a transparent caching server monitors content passing between a source (e.g., the external data network) and a destination (e.g., end-user customers of the Telco). The monitoring is performed to determine what content to cache. The monitoring is also performed in order to intercept requests for content that the transparent caching server has cached, wherein intercepting a request prevents the request from reaching an intended recipient that ordinarily serves the requested content (e.g., a content provider server or a CDN caching server). Upon intercepting a request, the transparent caching server can serve the content requested in the request from cache back to the requestor, without the request reaching the intended recipient and without the intended recipient being aware that the content was requested or was served by another (i.e., the transparent caching server). CDN caching servers typically perform no such monitoring and interception. Instead, CDN caching servers typically respond to a request when the request is routed to a particular CDN caching server usually as a result of some redirection, wherein the redirection may include DNS redirection, aliasing and URL rewriting as some examples.

By deploying one or more transparent caching servers within a Telco network, the Telco, in a sense, can create and operate its own local CDN independent of the external CDNs operated, for example, by Edgecast or Akamai. This further accelerates the delivery of content to the Telco's end users as the Telco is often the final link in the delivery chain to the end users. Telcos benefit from the deployment of transparent caching servers because such servers reduce the amount of traffic outside the Telco network, thereby reducing bandwidth costs for the Telco. Stated differently, some of the end user requested content can be served from the local cache of the transparent caching server that is internal to the Telco network instead of having to use external data network bandwidth when serving the requested content from CDN caching servers, origin servers of a content provider, or other servers that are located in the data network that is external to the data network operated by the Telco.

This interruption in the end-to-end delivery capability of the CDN prevents requests for certain content from reaching the CDN and from being serviced by the CDN. As a result, the revenue stream of the CDN is impacted as less content is served by the CDN on behalf of the CDN's content provider customers. Also, the metrics computed by the CDN for measuring the demand for content provider customer content and for measuring the performance in delivering such content are impacted. Specifically, the measurements are inaccurate because the CDN no longer delivers all content on behalf of its content provider customers. For example, there may be a thousand distinct requests for a particular content provider customer's content that the CDN is to deliver on behalf of the particular content provider customer. However, it may be that only seven hundred of those requests are serviced by the CDN's caching servers and the other three hundred requests are intercepted before reaching the CDN's caching servers and are instead serviced by transparent caching servers operated by one or more Telcos. In this scenario, the CDN will report to the particular content provider customer that its content was requested only seven hundred times, when in actuality the content was requested one thousand times. In other words, the performance measurements and other metrics related to the delivery of the particular content provider customer's content and that are reported by the CDN to the particular content provider customer will only take into account the content delivered in response to the seven hundred requests serviced by the CDN while omitting performance measurements and other metrics related to the three hundred requests that were intercepted and serviced by the transparent caching servers. As a result, the CDN underreports the demand for the particular content provider customer's content and any other metrics are inaccurate.

The interruption in the CDN's end-to-end delivery capability also raises intellectual property rights issues. Based on the contract that the content provider customer establishes with the CDN, it may be that only the CDN is authorized to cache, host, distribute, or otherwise serve content of the content provider customer and any transparent caching of the content provider customer's content violates the terms governing who is authorized to cache, host, distribute, or otherwise serve such content.

Accordingly, there is a need for a true end-to-end CDN solution. There is a need for such an end-to-end CDN solution to leverage and account for components in the delivery chain that are both operated by the CDN and not operated by the CDN (i.e., operated by a third party such as a Telco). There is a need for such an end-to-end CDN solution to more accurately determine metrics associated with delivering content provider customer content, to ensure authorized distribution of such content and to compensate the CDN for delivering all of such content.

SUMMARY OF THE INVENTION

It is an objective of the embodiments described herein to provide an end-to-end Content Delivery Network (CDN) solution. To do so, it is an objective to assimilate components and existing resources of one or more third-party intermediaries with those of a CDN, in order to create a federated CDN that has access to each link in the delivery chain over which content is delivered from a server of the federated CDN to end users.

To achieve these and other objectives, some embodiments provide an end-to-end federated CDN solution that assimilates existing independently-operated components and resources of a third-party intermediary with those of a CDN. More specifically, some embodiments provide systems and methods for assimilating one or more transparent caching servers that are operated by one or more transparent caching server operators (e.g., Telcos) into a CDN, wherein the CDN operates a set of CDN caching servers independent of the transparent caching servers that are operated by the transparent caching server operators.

The systems and methods for performing such assimilation establish a relationship that is mutually beneficial to the transparent caching server operators as well as the CDN operator. From this relationship, a transparent caching server operator receives compensation (typically monetary) from a CDN operator in return for providing the CDN operator access to the logs of the transparent caching servers that are operated by the transparent caching server operator. The CDN operator benefits from the gained access to the transparent caching server logs because such access allows the CDN operator (1) to more accurately and comprehensively track and report metrics related to the delivery of content for the CDN's content provider customers and (2) to monetize the end-to-end delivery for CDN content provider customer content including the ability to monetize on the CDN content provider customer content that is delivered by the transparent caching servers, whereas prior to such assimilation, the transparent caching servers could intercept and serve such content without the CDN's knowledge and without the CDN logging such usage. The assimilation of the transparent caching servers also improves the overall content delivery capabilities of the CDN as the transparent caching servers can deliver content on behalf of the CDN's content provider customers to some end users with less latency than the CDN caching servers; and the CDN operator can account for the delivery performance of the transparent caching servers as a result of having access to their logs, thereby improving the overall content delivery performance of the CDN. Furthermore, the assimilation of the transparent caching into the CDN can be performed with little to no change on the part of the transparent caching server operator and with little additional overhead to the CDN operator.

In some embodiments, the systems and methods for creating the federated CDN in which transparent caching servers are assimilated with CDN caching servers involve establishing a sharing relationship between the transparent caching server operator and the CDN operator. The sharing relationship sets the conditions upon which the transparent caching server operator provides the CDN operator access to the logs of the transparent caching servers. The sharing relationship further sets the compensation (e.g., fixed or variable) that the CDN operator provides to the transparent caching server operator in return for the access and also the access credentials with which the CDN operator can remotely access the transparent caching servers in order to aggregate the logs from the transparent caching servers.

In some embodiments, the systems and methods for creating the federated CDN involve configuring a log processing server (i.e., administrative server) of the CDN to periodically aggregate the one or more logs from each assimilated transparent caching server through a remote connection. Using the remote connection, the log processing server may periodically pull the logs from the transparent caching servers that have been assimilated into the CDN. Alternatively, the assimilated transparent caching servers may periodically push the logs to the log processing server using the remote connection.

The log processing server processes each log in conjunction with an association table. The association table includes entries for relating network usage that is entered into the aggregated logs. By using the association table, some or all of the network usage in the aggregated logs is related back to a CDN content provider customer who originates or otherwise authorizes dissemination of the content by the CDN (i.e., a content provider that has contracted the CDN to deliver content on its behalf).

In some embodiments, the network usage from the aggregated transparent caching server logs that is identified for a CDN's content provider customer is used to report on the delivery of the content provider customer's content. From the identified network usage, the log processing server derives metrics that quantify performance, demand, and other parameters relating to the delivery of the content provider customer's content. In some such embodiments, the network usage identified from the transparent caching server logs is combined with network usage for the same content provider customer as identified in logs that are aggregated from the CDN caching servers. In so doing, the CDN derives comprehensive and accurate performance metrics that account for CDN-controlled components as well as components controlled by third parties, both of which are nevertheless used to deliver content of the content provider customer.

In some embodiments, the network usage from the aggregated transparent caching server logs that is identified for a CDN's content provider customer is used to bill the content provider customer for that network usage. Specifically, the content provider customer is assessed a fee for the network usage that is associated with the content that has been delivered on behalf of the content provider customer by the transparent caching server that is now assimilated into the CDN. This fee may be computed using the same algorithms and criteria that would have been used if the content was delivered from a caching server of the CDN instead of the transparent caching server. In some embodiments, the assessed fee is a fee that is derived based on the network usage that is associated with the content delivery identified in the logs aggregated from the transparent caching servers and also the network usage that is identified in the logs aggregated from caching servers of the CDN.

BRIEF DESCRIPTION OF THE DRAWINGS

In order to achieve a better understanding of the nature of the present invention, preferred embodiments for the end-to-end CDN solution will now be described, by way of example only, with reference to the accompanying drawings in which.

DETAILED DESCRIPTION

In the following detailed description, numerous details, examples, and embodiments for systems and methods for the end-to-end Content Delivery Network (CDN) solution are set forth and described. As one skilled in the art would understand in light of the present description, these systems and methods are not limited to the embodiments set forth, and these systems and methods may be practiced without some of the specific details and examples discussed. Also, reference is made to the accompanying figures, which illustrate specific embodiments in which the systems and methods can be practiced. It is to be understood that other embodiments can be used and structural changes can be made without departing from the scope of the embodiments herein described.

I. Framework

Figure 1:
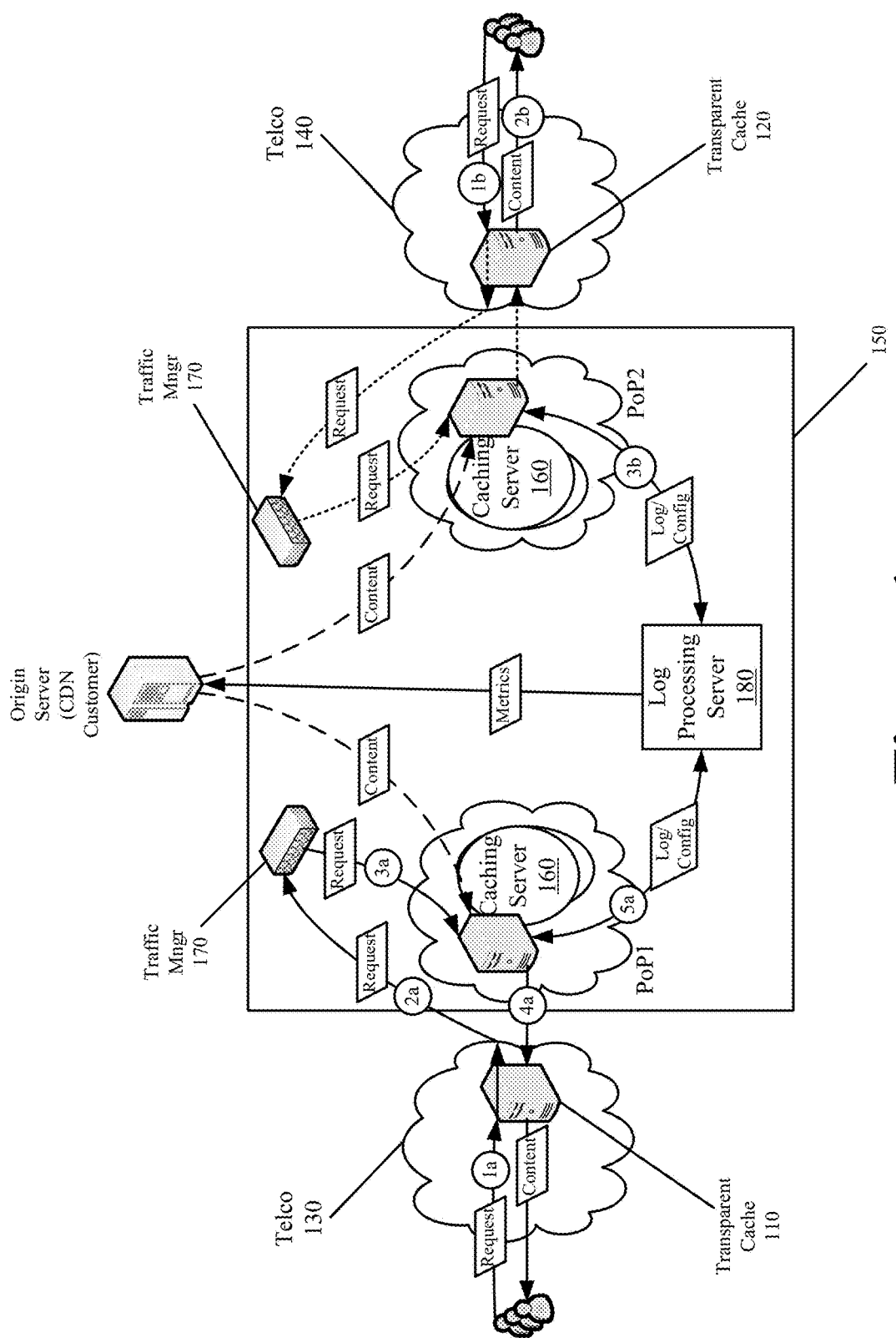
FIG. 1 presents an exemplary framework for the end-to-end CDN solution in accordance with some embodiments.

FIG. 1 presents an exemplary framework for the end-to-end CDN solution in accordance with some embodiments. The end-to-end CDN solution is the result of assimilating two transparent caching servers 110 and 120 that are independently operated by different Telcos 130 and 140 with CDN caching servers 160 of a CDN 150. The end-to-end CDN solution, allows the CDN 150 to expand its reach by leveraging already deployed resources of the Telcos 130 and 140 (i.e., the transparent caching servers 110 and 120). In so doing, the CDN 150 improves its content delivery performance, provides more comprehensive reporting, and lowers overall cost of content delivery.

Each transparent caching server 110 and 120 may be representative of a fully integrated machine having the software and hardware necessary to perform transparent caching or proxy caching. Each transparent caching server 110 and 120 may alternatively be representative of a machine that is integrated with the necessary software or hardware to perform transparent caching or proxy caching in conjunction with other functionality. Furthermore, each transparent caching server 110 and 120 may be representative of one or more physical machines or virtual machines that run on one or more physical machines to perform transparent caching or proxy caching. Transparent caching and proxy caching is defined in conformance with the well understood industry definition. Accordingly, the terms are intended to generally include any machine that performs a monitoring and/or intercepting function as part of a caching function.

The monitoring and caching function is illustrated by the transparent caching server 110 while the intercepting and caching function is illustrated by the transparent caching server 120. The transparent caching server 110 is positioned between the end user subscribers of the Telco 130 and a gateway from which the end user subscribers request and obtain content from an external data network such as the Internet. The transparent caching server 110 monitors content passing between a source (e.g., the external data network) and a destination (e.g., an end user subscriber of the Telco 130). The monitoring is performed to analyze end user subscriber submitted requests for content in order to determine whether the transparent caching server 110 has the requested content cached. In this example, the transparent caching server 110 receives a request from an end user subscriber of Telco 130, analyzes the request, and determines that the requested content is not cached. In some embodiments, the transparent caching server 110 does not intercept the request and allows the request to pass into the external data network for routing to the appropriate source. In some embodiments, the transparent caching server 110 intercepts the request, but reissues the request to the original intended recipient in the external data network with the transparent caching server 110 identified as the request originator. As shown, the passed through or reissued request is routed to a CDN caching server of the CDN 150 that serves the content back. The served content passes through the transparent caching server 110. The transparent caching server 110 monitors the content and identifies the content being sent in response to the request and so the transparent caching server 110 caches the content. In so doing, any subsequent requests for the same content by an end user subscriber of the Telco 130 can be intercepted and the content can be served from the transparent caching server 110 instead of the more remote CDN caching server or more remote content provider server that may also host the requested content. For the purposes of the discussion that is to follow, it is irrelevant how the transparent caching server 110 performs transparent caching whether by passing through requests or intercepting and reissuing requests. Accordingly, any method of operation that is well known in the art is adaptable and applicable to the end-to-end caching solution described herein.

Similar to the positioning of the transparent caching server 110, the transparent caching server 120 is positioned between the end user subscribers of the Telco 140 and the external data network (i.e., Internet). The transparent caching server 120 monitors requests that are issued by the end user subscribers of the Telco 140. In the illustrated example, the transparent caching server 120 identifies a request for content that the transparent caching server 120 has cached. Accordingly, the transparent caching server 120 intercepts the request thereby preventing the request from being forwarded to the external data network and, in turn, preventing the request from being received by a CDN caching server of the CDN 150 or content provider server that hosts the requested content. The transparent caching server 120 then satisfies the intercepted request by passing the requested content from its cache to the requesting end user subscriber of Telco 140.

The transparent caching server 110 is independently operated by the Telco 130 and the transparent caching server 120 is independently operated by the Telco 140 such that access to the transparent caching server is ordinarily restricted to the operating entity. Each transparent caching server 110 and 120 is assigned a network address (i.e., an Internet Protocol (IP) address) such that it may be accessed using a remote connection. The remote connection may be established using the HyperText Transfer Protocol (HTTP), File Transfer Protocol (FTP), Secure Shell (SSH) protocol, Spanning Tree Protocol (STP), Transmission Control Protocol (TCP), or other networking protocol. The remote connection can be used to manage the transparent caching server by configuring the rules for how the transparent caching server determines what content to cache and when to cache the content. The remote connection can also be used to retrieve and view the logs of the transparent caching servers 110 and 120. The log for the transparent caching server 110 tracks the content that was delivered by the transparent caching server 110. The parameters tracked to the log typically include at least one identifier for identifying the content that was delivered and bandwidth utilization that is associated with delivering the content. The identifier for identifying the content may include an IP address, Uniform Resource Identifier (URI), or string representing the content name. The bandwidth utilization may be quantified by a file size or kilobyte/megabyte per second with an associated amount of time needed to deliver the content. It should be apparent to one of ordinary skill in the art that the log may include additional or other parameters for identifying the content that is delivered by the transparent caching server and for identifying the source entity and/or destination entity for the delivered content.

As noted above, the Telcos 130 and 140 are service providers that provide one or more end user subscribers connectivity to data networks, including the Internet. The Telcos 130 and 140 are the initial point of entry for the end users to these data networks. Also, the Telcos 130 and 140 are the final link in the delivery chain (or path) for content that is delivered from the data networks to the end user subscribers. For purposes of simplicity, the other components besides the transparent caching servers of the Telcos 130 and 140 are abstracted and not shown. Though Telcos 130 and 140 are presented in FIG. 1, it should be apparent to one of ordinary skill in the art that the Telcos 130 and 140 may be substituted by any operator of one or more transparent caching servers that operates the transparent caching servers independent of the CDN 150 and also locates the transparent caching servers at some point along the delivery path in which content is passed from the CDN 150 or from any external data network to one or more end users. Therefore, it should be apparent to one of ordinary skill in the art that the operation of the transparent caching servers 110 and 120 need not be confined to the illustrated Telcos (130 and 140), but that the transparent caching servers 110 and 120 can operate at any intermediary location between a source and a destination irrespective of whether the intermediary location is at a location in a Telco or some other network or service provider (e.g., any ISP).

Some appliance manufacturers for the transparent caching servers 110 and 120, and more generally, for the transparent caching servers envisioned for the federated end-to-end CDN solution are those manufactured by PeerApp Ltd. and Blue Coat Systems Inc. It is irrelevant whether the transparent caching servers that are assimilated to create the end-to-end solution and that are shown in the exemplary framework of FIG. 1 are identical or different machines from the same manufacturer or different manufacturers.

The CDN 150 is conceptually illustrated with a distributed set of CDN caching servers 160, traffic management servers 170, and a log processing server 180. The figure also illustrates the interactions that CDN customers, including content provider customers, have with the CDN 150 and interactions that content consumers or end users have with the CDN 150.

Each CDN caching server of the set of CDN caching servers 160 may represent a single physical machine or a cluster of machines that serves content on behalf of different CDN content provider customers to end users of the illustrated Telcos 130 and 140 and to any other content consumer that requests content that the CDN 150 has been contracted to serve on behalf of the CDN content provider customers. One set of CDN caching servers 160 may represent a server farm for a geographically proximate set of physically separate machines or a set of virtual machines that execute over partitioned sets of resources of one or more physically separate machines. The set of CDN caching servers 160 are distributed across different edge regions of a data network (i.e., the Internet) to facilitate accelerated delivery of content. Specifically, the set of CDN caching servers 160 are distributed to form different points-of-presence (PoPs) at these different edge regions.

The CDN 150 uses the traffic management servers 170 to route an end user that requests content of a content provider customer to the closest PoP in order to optimally serve the requested content to the requesting end user. Stated differently, the traffic management servers 170 resolve requests for content that is hosted by the CDN 150 to the CDN caching server that optimally serves that content back to the end user, wherein optimally serving the content is quantified in terms of proximity, latency, jitter, packet loss, time to buffer, and other such measureable metrics. Different CDN implementations use different traffic management schemes to achieve such routing to the optimal PoPs or CDN caching servers. As one example, the traffic management servers 170 perform Anycast routing to identify a CDN caching server from the set of CDN caching servers 160 that can optimally serve requested content to a particular end user requesting the content. It should be apparent that the traffic management servers 170 can include different combinations of Domain Name System (DNS) servers, load balancers, and routers performing Anycast or Border Gateway Protocol (BGP) routing.

The log processing server 180 may include a central server of the CDN 150 or a distributed set of interoperating servers that perform the configuration control, reporting, and billing functionality for the CDN 150. Content providers register with the CDN 150 in order to access services and functionality of the CDN 150. Accordingly, content providers are also referred to as customers of the CDN 150. Once registered, CDN content provider customers can interface with the log processing server 180 to specify a configuration, upload content, and view performance reports. The log processing server 180 also aggregates statistical and performance data from each server of the set of CDN caching servers 160. The log processing server 180 processes the aggregated data to produce usage and performance reports. From these reports, CDN content provider customers can better understand the demand for their content, the performance provided by the CDN 150 in delivering their content, and the need for capacity reallocation, among other uses. The log processing server 180 also processes the aggregated logs to bill the CDN's content provider customers for the network usage that is related to the delivery of the content provider customers' content by the CDN caching servers 160. Network usage generally refers to an amount of bandwidth consumed when delivering content from a source to a destination. Network usage may be quantified as a bits/bytes consumed over some duration (e.g., 10 KB/s for 10 seconds) or as the file size for content that is delivered from a source to a destination.

By assimilating the transparent caching servers 110 and 120 with the caching servers 160 of the CDN 150, the CDN 150 is able to expand its reach by leveraging already deployed resources of third parties. In so doing, the overall content delivery performance of the CDN 150 is improved. This is a result of the closer geographic proximity that the transparent caching servers 110 and 120 have to the end user subscribers of the Telcos 130 and 140 relative to the CDN caching servers 160 and because the CDN 150 can factor, as a result of the assimilation, the content delivery performance of the transparent caching servers 110 and 120 with the content delivery performance of its own CDN caching servers 160 when determining overall content delivery performance for the CDN content provider customers. Prior to the end-to-end CDN solution and the assimilation of the transparent caching servers 110 and 120 into the CDN 150, the content delivery performance of the transparent caching servers 110 and 120 would be unaccounted for by the CDN 150 when the CDN 150 reported content delivery performance to its content provider customers and when some content of those content provider customers was actually being served by the transparent caching servers 110 and 120. However, the end-to-end solution resolves these issues and enables the CDN 150 to produce comprehensive and accurate reporting that not only accounts for the content delivery performance of the CDN caching servers 160, but that also accounts for the content delivery performance of the transparent caching servers 110 and 120 that are located at the final link in the delivery chain between end users and the CDN 150. Also, assimilating the transparent caching servers 110 and 120 grows the CDN 150 footprint and the content delivery capabilities of the CDN 150. In so doing, the overall cost for content delivery is lowered. Specifically, the traditional CDN model has each CDN compete with other CDNs, Telcos, etc. In competing with one another, CDNs are in a continual struggle to expand their capacity and capabilities. This expansion results in each CDN incurring the same or similar infrastructure costs related to the deployment of caching servers to designated high traffic areas. This further results in redundant deployment of resources, whereby multiple CDNs operate in the same regions with excess capacity as a result of cannibalizing content delivery from one another. The cost for this redundant deployment of resources is incurred by the CDNs. The CDNs propagate this cost to their content provider customers in the form of higher fees being charged for the bandwidth that is consumed for delivering the content of the content provider customers. The content provider customers then propagate the increased cost to the end users that consume the content in the form of higher subscription fees, content access fees, or other fees.

II. End-to-End Cdn Solution

Figure 2:
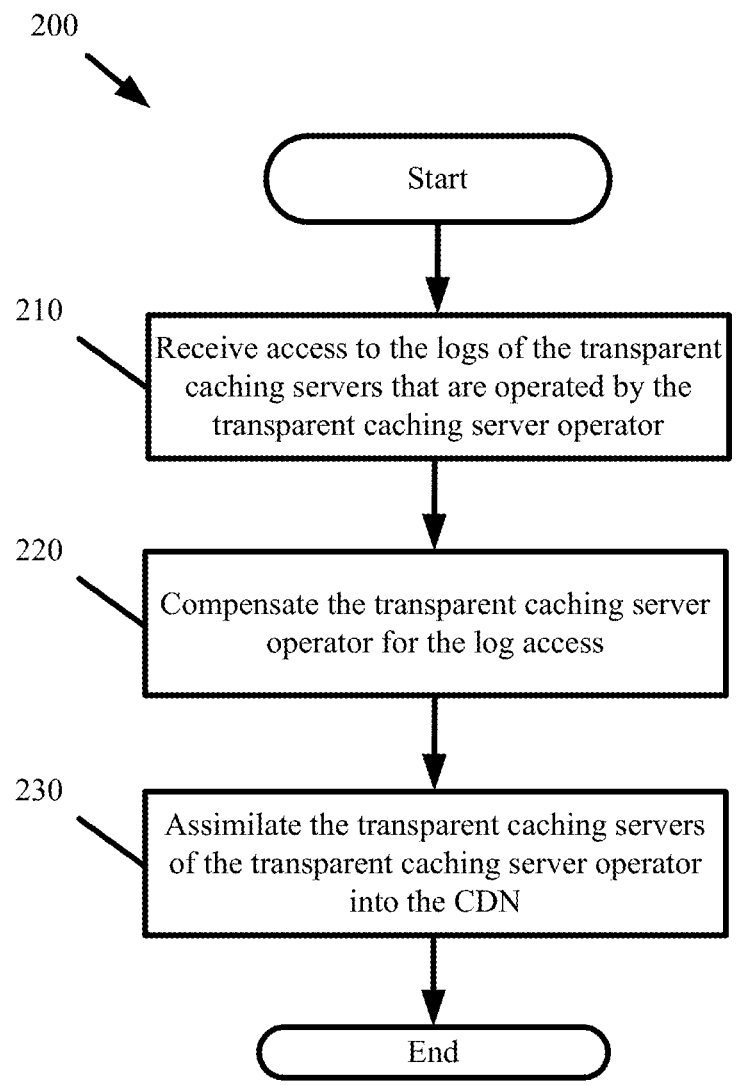
FIG. 2 presents a process for assimilating transparent caching servers into a CDN in accordance with some embodiments.
Figure 3:
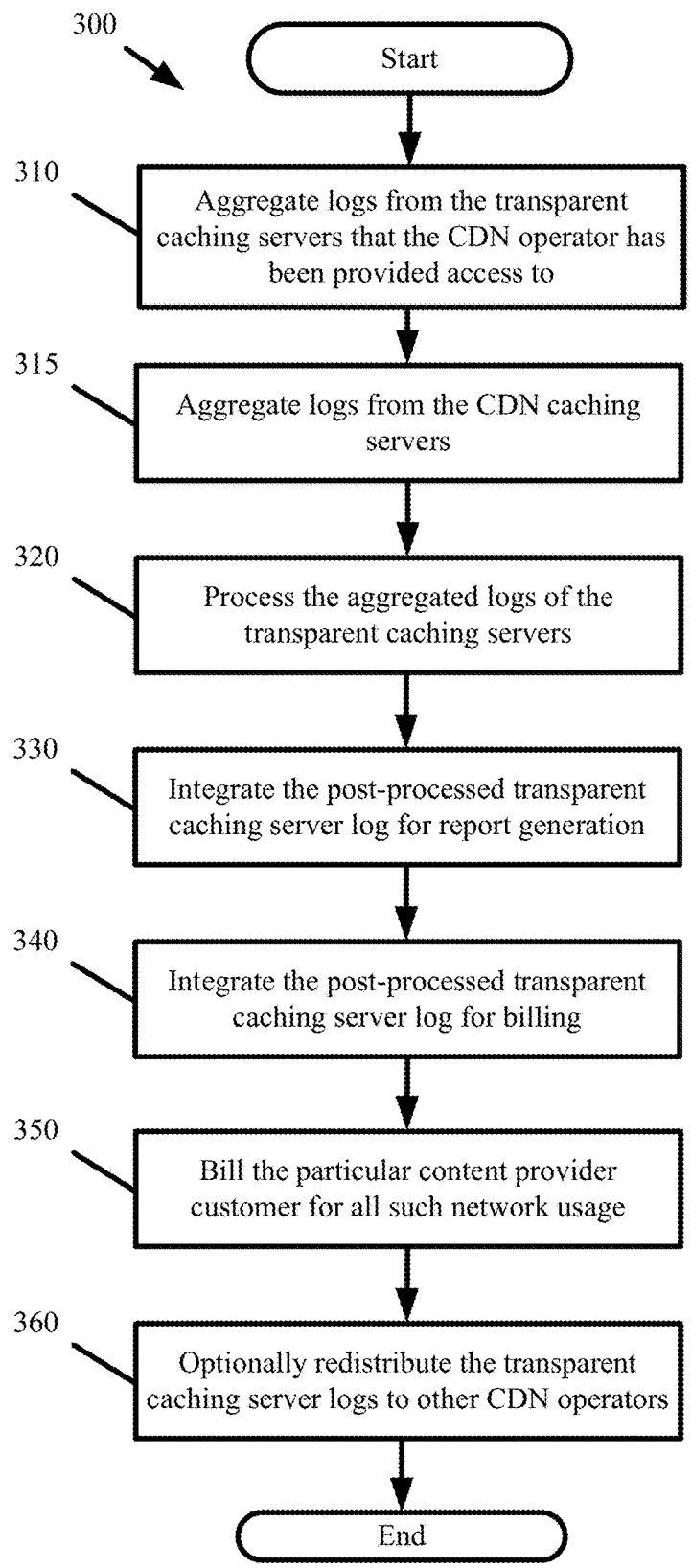
FIG. 3 presents a process for utilizing assimilated transparent caching server logs to provide an end-to-end CDN solution in accordance with some embodiments.

FIGS. 2 and 3 present processes for implementing the end-to-end CDN solution through the assimilation of transparent caching servers with a CDN in accordance with some embodiments. FIG. 2 presents a process 200 for assimilating transparent caching servers into a CDN in accordance with some embodiments. This process 200 describes a reciprocal bilateral agreement between two independent parties. The first party to the bilateral agreement is a transparent caching server operator that operates a transparent caching server independent of the second party. The transparent caching server operator can include a Telco, ISP, or any other entity that operates one or more transparent caching servers. The second party to the bilateral agreement is a CDN operator that operates a CDN and a distributed set of CDN caching servers. EdgeCast, Akamai and LimeLight are examples of different CDN operators.

As part of the bilateral agreement, the CDN operator receives (at 210) access to the logs of the transparent caching servers that are operated by the transparent caching server operator. In return, the CDN operator compensates (at 220) the transparent caching server operator for such log access. The terms and conditions for the bilateral agreement are memorialized to detail the bilateral agreement between the transparent caching server operator and the CDN operator. The CDN operator can then assimilate (at 230) the transparent caching servers of the transparent caching server operator into its CDN in the manner described with reference to FIG. 3 below.

The reciprocal bilateral agreement entered into between the transparent caching server operator and the CDN operator is one that can be exclusive in nature or one that is non-exclusive in nature. An exclusive bilateral agreement is one in which only the CDN operator (that is a party to the agreement) receives or is provided any form of access to the logs of the transparent caching servers. Stated differently, the transparent caching server operator is contractually prevented from distributing or otherwise providing other CDN operators or other entities that are not a party to the bilateral agreement access to the transparent caching server logs. A non-exclusive bilateral agreement is one that does not contractually restrict the transparent caching server operator from providing other entities access to the logs of the transparent caching servers. The bilateral agreement and, by extension, the process 200 may be initiated by either the CDN operator or the transparent caching server operator.

The CDN operator may receive the logs of the transparent caching servers via different pull or push mechanisms. For some such push or pull mechanisms, the transparent caching server operator provides the CDN operator with remote access to the transparent caching servers. Typically, a transparent caching server has a network interface with which the transparent caching server can be remotely accessed using a network communication protocol. In some embodiments, the remote access to a transparent caching server is established using HTTP, FTP, SSH, STP, or some other network protocol. This remote access may be restricted to authorized users. In some embodiments, the transparent caching server operator configures the transparent caching servers with username and password combinations that can be used to identify the authorized users. Therefore as part of the bilateral agreement entered in between the CDN operator and the transparent caching server operator, the transparent caching server operator may provide the CDN operator with the secure access credentials (e.g., username and password) that the CDN operator can use to remotely access the transparent caching servers in order to obtain the logs from those servers. In some embodiments, the transparent caching servers are configured by the transparent caching server operator to periodically push the logs to the CDN operator. In some embodiments, the transparent caching server operator may also provide the CDN operator access to the logs without providing the CDN operator remote access to the transparent caching servers. For instance, as part of the bilateral agreement, the transparent caching server operator agrees to periodically (e.g., weekly or monthly) aggregate the logs from its transparent caching servers and then pass the aggregated logs to the CDN operator, such that the transparent caching server operator maintains full control over its transparent caching servers. This latter method of providing transparent caching server logs may be preferred when the transparent caching server operator provides the CDN operator only partial access to the logs. For example, the transparent caching server operator may not want the CDN operator to know all the content that is being served from its transparent caching servers. Therefore, the transparent caching server operator can filter the logs before providing the CDN operator access to the logs. The filtering can be performed to remove usage entries that identify content that is originated or sourced by a content provider that is not a customer of the CDN. The CDN operator may provide the transparent caching server operator identifiers for identifying the content providers that are the CDN's customers and whose usage should not be filtered from the transparent caching server logs when filtering is to be performed.

As noted above, the CDN operator compensates (at 220) the transparent caching server operator for the transparent caching server log access. In some embodiments, the CDN operator provides fixed compensation to the transparent caching server operator for access to each transparent caching server log. The compensation may be monetary. For example, the CDN pays the transparent caching server operator ten dollars for each log that the CDN gains access to. The compensation may also be recurring, such that the CDN operator pays the transparent caching server operator ten dollars every month for monthly access to the logs of a particular transparent caching server. The compensation may also be an exchange of services. For instance, the transparent caching server operator provides the CDN operator free access to the transparent caching server logs when the CDN operator agrees to deliver content on behalf of the transparent caching server operator to end users that are outside the network controlled by the transparent caching server operator. It should be apparent to one of ordinary skill in the art that the compensation may be provided with other means in which some economic value is imparted to the transparent caching server operator for providing the CDN operator access to the transparent caching server logs. In some embodiments, the CDN operator provides variable compensation to the transparent caching server operator. The variable compensation may be based on a specified set of conditions. As a specific example, the variable compensation may be based on a percentage of monetization that the CDN operator realizes from the log. Continuing with the example, if the log identifies usage for the CDN's content provider customers and the CDN operator is able to charge the content provider customers one hundred dollars for such usage, the variable compensation may be ten percent of the fee collected by the CDN, which, in this example, amounts to ten dollars of compensation that the CDN operator provides back to the transparent caching server operator.

Accordingly, the bilateral agreement is a reciprocal agreement in which the CDN operator gains access to the logs of the transparent caching servers and the transparent caching server operator is compensated by the CDN operator for such access. This reciprocity provides incentive to both parties to enter into the bilateral agreement, as the bilateral agreement is one that both the transparent caching server operator and the CDN operator benefit from. Specifically, the CDN operator gains access to the logs of the transparent caching servers. These logs enable the CDN to more comprehensively track network usage for the CDN's content provider customers. Before assimilation of the transparent caching servers, the CDN operator could only reliably track network usage to the level of the Telco or to the level of where a transparent caching server existed in the delivery chain in which content is passed from a CDN caching server to an end user. After assimilation of the transparent caching servers, the CDN operator can reliably track end-to-end network usage all the way down to the end user level. This allows the CDN operator to produce more comprehensive and detailed reports, performance measurements, and other metrics relating to the delivery of the CDN's content provider customers' content to the end users. Also, by gaining access to each link in the delivery chain to the end user, the CDN operator is able to accurately bill its content provider customers for network usage relating to delivering the content provider customers' content to each end user. Before such assimilation, it was likely that a transparent caching server at an intermediary position in the delivery chain would cache content the first time it is passed from a CDN caching server to a requesting end user. Then, a subsequent request for the same content by an end user at the end of the same delivery chain would not reach the CDN and would instead be intercepted and served from the transparent caching server cache without the CDN's knowledge. As a result, content provider customers had their content partially delivered free of charge. After assimilation of the transparent caching servers into the CDN, the content provider customers are billed for all network usage that is related to delivering their content to end users, even if such delivery is accelerated by one or more transparent caching servers. The transparent caching server operator also benefits from this reciprocal bilateral agreement because the transparent caching server operator would previously receive no compensation for delivering the CDN's content provider customers' content, even though bandwidth was consumed when delivering such content from the transparent caching server's cache to the end users. By entering into the reciprocal bilateral agreement with the CDN operator, the CDN operator indirectly compensates the transparent caching server operator for such network usage by directly compensating the transparent caching server operator for access to the logs that are then used to pass the network usage fees to the CDN's appropriate content provider customer.

FIG. 3 presents a process 300 for utilizing assimilated transparent caching server logs to provide an end-to-end CDN solution in accordance with some embodiments. The process 300 commences once a bilateral agreement has been formalized with one or more transparent caching server operators. The process 300 is performed by a CDN operator. More specifically, the process 300 is a machine-implemented process that is performed by a particular machine under control of the CDN operator. In some embodiments, the process 300 is performed by any server of the CDN operator that is responsible for billing in the CDN, such as the log processing server described with reference to FIG. 1 above. The machine-implemented process is embodied as a set of instructions for a program that is stored to a non-transitory computer-readable storage medium and the program is executed by a microprocessor to automatedly perform the instructions recited below.

The process 300 begins by aggregating (at 310) logs from the transparent caching servers to which the CDN operator has been provided access, pursuant to one or more bilateral agreements. The logs may be aggregated from transparent caching servers that are operated by different operators (e.g., a first transparent caching server that is operated by a first Telco and a second transparent caching server that is operated by a second Telco). As noted above, the logs may be aggregated by (1) remotely accessing the transparent caching servers and pulling the logs from the remotely accessed servers, (2) configuring the transparent caching servers to periodically push the logs to the CDN operator, or (3) obtaining the logs from the transparent caching server operator. Accordingly, aggregation may involve downloading the logs from the servers, retrieving copies of the logs from the servers, or having the logs pushed from the servers via a file transfer mechanism such as FTP.

The process also aggregates (at 315) logs from CDN caching servers that are operated by the CDN operator. In embodiments involving a federated CDN, the process may aggregate logs from CDN caching servers that are operated by a first CDN operator and logs from CDN caching servers that are operated by a second CDN operator, wherein the first and second CDN operators participate in the federated CDN. The CDN log processing server may aggregate the CDN caching server logs using a pull mechanism, whereby the log processing server remotely accesses each of the CDN caching servers and downloads the logs from the CDN caching servers. Alternatively, the CDN caching servers may periodically push their logs to the log processing server.

The process processes (at 320) the aggregated logs of the transparent caching servers. The processing is performed to identify network usage that is related to the delivery of content for content providers that are customers of the CDN. In some embodiments, the processing performed at step 320 involves filtering the aggregated logs to remove network usage that is related to delivering content for content providers that are not customers of the CDN operator. In some embodiments, the processing performed at step 320 involves filtering the network usage that is related to delivering content for content providers that are customers of the CDN operator and storing the filtered usage to a different filtered log. In some embodiments, the processing performed at step 320 involves processing the aggregated logs in conjunction with an association table. The association table aids in identifying network usage in the logs that is related to delivering content for different content providers that are customers of the CDN operator. In some embodiments, the association table contains a list of identifiers that identify the CDN's content provider customers based on IP addresses, URIs, DNS records (e.g., CNAMEs), etc. The CDN operator is provided these identifiers when a content provider registers as a customer of the CDN operator in order to have the CDN operator serve the content provider customer's content on behalf of the content provider customer. At that time, the CDN can enter the identifiers to the association table.

Figure 4:
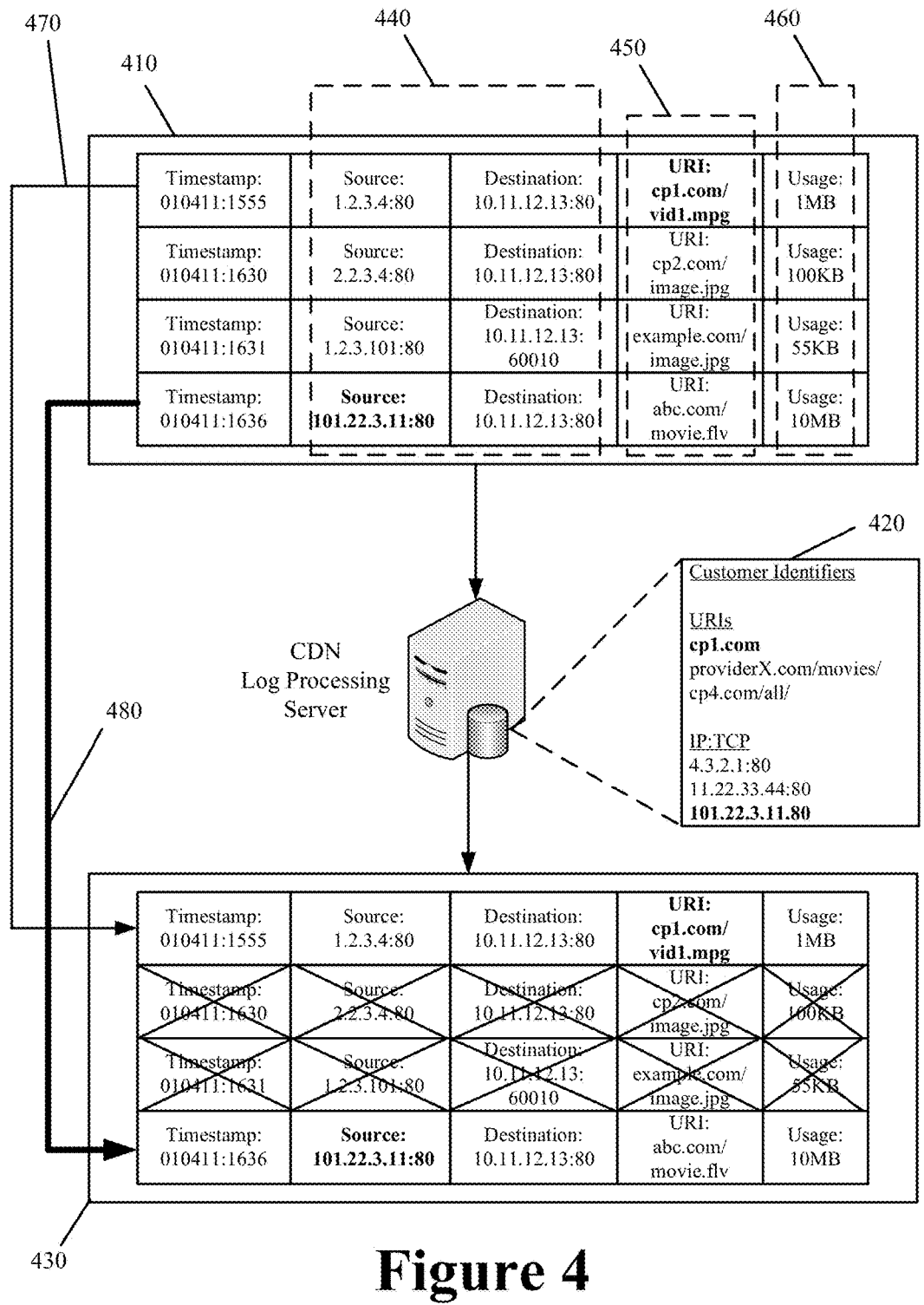
FIG. 4 illustrates processing transparent caching server logs in accordance with some embodiments.

FIG. 4 illustrates processing transparent caching server logs to identify network usage that is related to the delivery of content for content providers that are customers of the CDN in accordance with some embodiments. As with the process 300 of FIG. 3 above, the processing illustrated in FIG. 4 may be performed by a log processing server of the CDN. The figure illustrates log 410 that is aggregated from a transparent caching server, an association table 420 used by the log processing server in processing the log 410, and the log after it has been processed 430 (i.e., the post-processed log 430).

The transparent caching server log 410 tracks various network usage metrics related to content that is delivered from the transparent caching server that produced the log. Though simplified for explanatory purposes, the log 410 records one or more addressing identifiers 440, content identifiers 450, and network usage identifiers 460 for each item of content that is delivered by the transparent caching server. Different transparent caching servers record different identifiers, parameters, or metrics in the logs. Also, the logs aggregated from different transparent caching servers may present the recorded identifiers, parameters, or metrics in different formats. In some embodiments, the log processing server performs a pre-processing routine on the aggregated transparent caching server log to remove extraneous identifiers, parameters, or metrics and to format the remaining identifiers, parameters, or metrics according to a common format that includes some common baseline set of identifiers, parameters, or metrics.

In some embodiments, the addressing identifiers 440 identify the source and/or destination associated with the delivered content. The source and destination are typically addressed with different Internet Protocol (IP) addresses, although it should be apparent to one of ordinary skill that any addressing scheme may be used to identify the source and destination. The source addressing identifier identifies the source from which the delivered content is originally requested. Because a transparent caching server intercepts requests before they reach the content source, the source will typically identify a content provider that originates or is the source for the content being delivered. However, DNS resolution may cause the source addressing identifier to instead identify an address for a CDN caching server that delivers content on behalf of a particular content provider customer. The destination addressing identifier identifies the end user who requested and received the delivered content. The addressing identifiers 440 can be extracted from the header of the content request that is intercepted by the transparent caching server. For instance, the addressing identifiers 440 may include a source IP address and a destination IP address that are extracted from the header of an IP packet that encapsulates the content request. Alternatively, the domain name specified in the header of an HTTP GET request packet can be used to identify the source for the requested content. The extracted addressing identifiers 440 can then be entered in the log in association with the network usage that is required to deliver the requested content from the transparent caching server to the requesting end user.

The content identifiers 450 identify the delivered content. In some embodiments, the content identifiers 450 include the Uniform Resource Identifier (URI) that is used to request the content. Alternatively, the content identifiers 450 may include an object or file name. The content identifiers 450 are typically extracted from the header of the content request that was intercepted by the transparent caching server. For instance, the URI can be extracted from the header of an HTTP GET request packet. The extracted content identifiers 450 may be entered into the transparent caching server log in association with addressing identifiers 440 and the network usage that is required to deliver the content identified in the URI from the transparent caching server to the requesting end user.

The network usage identifiers 460 identify the network usage related to delivering the content from the transparent caching server to the requesting end user. Network usage is generally quantified as an amount of bandwidth that is consumed to serve the requested content from the transparent caching server to the requesting end user. The bandwidth may be represented as a file size for the content that is delivered from the transparent caching server to the requesting end user. Alternatively, the bandwidth may be represented as a duration and an average amount of bandwidth used over the duration (e.g., 10 Kbps for 10 seconds). It should be apparent to one of ordinary skill in the art that the network usage identifiers 460 may include any identifiers that quantify a rate or amount of data transfer from the transparent caching server to the requesting end user.

The association table 420 includes a list of identifiers for identifying the content provider customers of the CDN operator. In some embodiments, the list of identifiers includes IP addresses for the origin servers of the content provider customers, wherein an origin server is a server that is operated by a content provider customer and that hosts content of the content provider customer. In some embodiments, the list of identifiers includes URIs, object names, or file names identifying the content for the CDN's content provider customers. As was noted above, this information is acquired by the CDN operator when the content provider customers register with the CDN operator to have their content delivered by the CDN operator.

The processing (at step 320) involves matching identifiers from the log 410 to identifiers in the association table 420 in order to identify network usage from the transparent caching server logs that relate to delivered content for the CDN's content provider customers. When one or more identifiers from the association table 420 match to one or more identifiers associated with an entry in the transparent caching server log 410, that entry is entered to the post-processed log 430. In this manner, the post-processed log 430 records network usage from the transparent caching server log 410 that relates to the delivery of content for the CDN's content provider customers. As shown, two entries 470 and 480 from the log 410 identify network usage that is related to content that is delivered for the CDN's content provider customers. Specifically, the URI associated with entry 470 identifies a domain name for a CDN content provider customer and the source IP address associated with entry 480 identifies an IP address for an origin server of a CDN content provider customer. The other entries from log 410 may be omitted from the post-processed log 430 or otherwise denoted in the post-processed log 430 as not pertaining to the CDN's content provider customers.

With reference back to FIG. 3, the post-processed transparent caching server log (e.g., log 430) is integrated (at 330) for report generation. In some embodiments, integrating (at 330) the post-processed transparent caching server log for report generation involves identifying the network usage for each content provider customer of the CDN that is recorded to the post-processed transparent caching server logs and the aggregated CDN caching server logs and producing a comprehensive and detailed report for the combined network usage.

Figure 5:
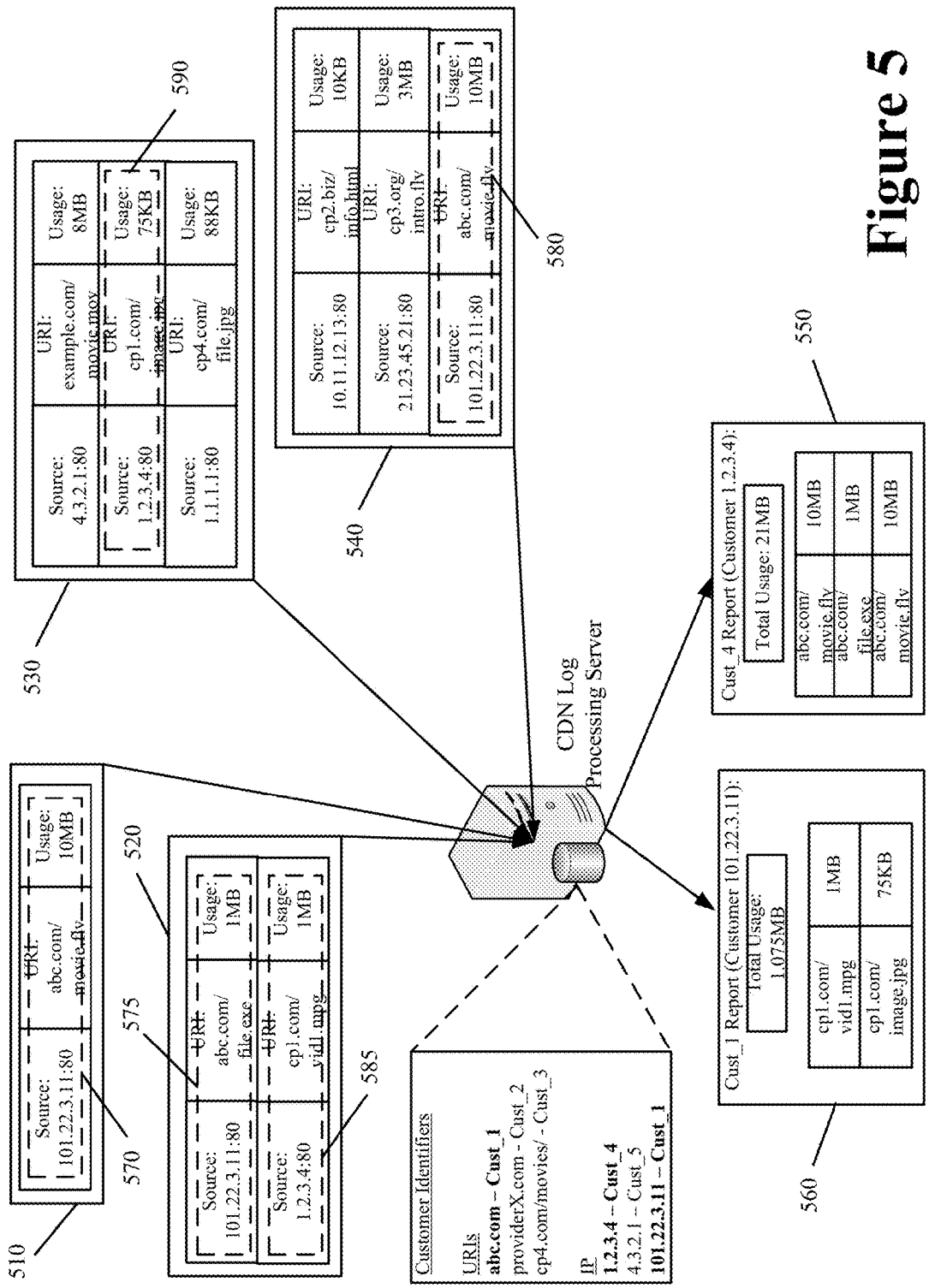
FIG. 5 conceptually illustrates generating comprehensive and detailed reports for the combined network usage of different content provider customers of the CDN in accordance with some embodiments.

FIG. 5 conceptually illustrates generating comprehensive and detailed reports for the combined network usage of different content provider customers of the CDN in accordance with some embodiments. This figure illustrates post-processed transparent caching server log 510, post-processed transparent caching server log 520, CDN caching server log 530, and CDN caching server log 540. The figure also illustrates two comprehensive reports 550 and 560 that are generated for two content provider customers of the CDN as a result of assimilating the post-processed transparent caching server logs 510 and 520 and integrating the network usage therein with the network usage identified in the CDN caching servers logs 530 and 540. The post-processed log 510 may be aggregated from a transparent caching server that is operated by a first Telco and the post-processed log 520 may be aggregated from a transparent caching server that is operated by the first Telco or a second Telco. The detailed reports 550 and 560 may be generated by a log processing server of the CDN.

To generate the report 550 for the first content provider customer of the CDN, the log processing server identifies the network usage in each of the logs 510-540 that is related to delivering the first content provider customer's content. This identification can be made using an association table such as the one described above with reference to FIG. 4, wherein various identifiers are provided to identify content and associated network usage that belongs to the first content provider customer and the second content provider customer of the CDN. For instance, the association table may include one or more IP addresses, URIs, DNS records that individually or in combination identify the first content provider customer of the CDN. As shown, the log processing server identifies entry 570 from log 510, entry 575 from log 520, and entry 580 from log 540 as entries that identify network usage that is related to the delivery of the first content provider customer's content. These entries 570-580 are then grouped to produce the report 550. In producing the report 550, the log processing server may format the entries 570-580 such that the resulting report 550 is uniformly formatted. In producing the report 550, the log processing server may analyze the entries 570-580 to identify trends or produce statistical data from the resulting aggregated set of data. For instance, the analysis of the collective set of entries 570-580 can yield the total network usage for delivering a particular item of content of the first content provider customer of the CDN to any number of end users or the total network usage that is associated with delivering all of the first content provider customer's content. Assuming that each log 510-540 tracks network usage over the same specified duration, entry 570 identifies 10 megabytes (MB) of network usage for delivering first content of the first content provider customer, entry 575 identifies 1 MB of network usage for delivering second content of the first content provider customer, and entry 580 identifies 10 MB of network usage for delivering the first content of the first content provider customer. Accordingly, the total network usage for delivering all content of the first content provider customer over the specified duration is 21 MB and the total network usage for delivering the first content of the first content provider customer is 20 MB.

To generate the report 560, the log processing server identifies entry 585 from transparent caching server log 520 and entry 590 from CDN caching server log 530 as entries that identify network usage that is related to the delivery of the second content provider customer's content. As above, these entries 585-590 are grouped to produce the report 560 wherein producing the report 560 may include formatting and/or analyzing the entries 585-590.

The reports 550 and 560 may be viewable through a graphical or interactive interface provided by the CDN. The reports 550 and 560 may also be sent to the customers on a periodic basis via email, traditional mail, or some other delivery means. In some embodiments, the reports 550 and 560 generated as a result of the assimilation of transparent caching server logs 510 and 520 with the CDN caching server logs 530 and 540 serve at least one of two purposes. Firstly, the CDN operator may use the reports to provide comprehensive reporting for the content delivery that is associated with content of each of the CDN's content provider customers. In the prior art, it is typical for the CDN operator to provide its content provider customers with performance metrics, network usage metrics, distribution analysis, trends, histograms, etc. in order for the content provider customers to understand and appreciate the demand for their content, who is consuming their content, where their content is being distributed to, as well as which content is in demand. However, such prior art reporting is deficient and incomplete in many respects because without assimilating transparent caching logs into the reporting, the reporting is based solely on the network usage that is tracked to the logs of the CDN caching servers and does not account for the network usage provided by the transparent caching servers that are located along the delivery path from the CDN to the end users. Consequently, this deficiency skews the metrics and numbers that are reported to the content provider customers, thereby providing the content provider customers a false and inaccurate representation of the reported performance metrics, network usage metrics, distribution analysis, trends, histograms, etc. In the embodiments described herein, this reporting deficiency is resolved by the assimilation of the transparent caching server logs with the CDN caching server logs. Specifically, by means of the assimilation, the CDN operator can now provide an end-to-end solution that accurately reports and accounts for all links in the delivery chain by which content is delivered from the CDN to end users. This deficiency, and how it is overcome by the end-to-end solution of the embodiments described herein, is presented in FIG. 6.

Figure 6:
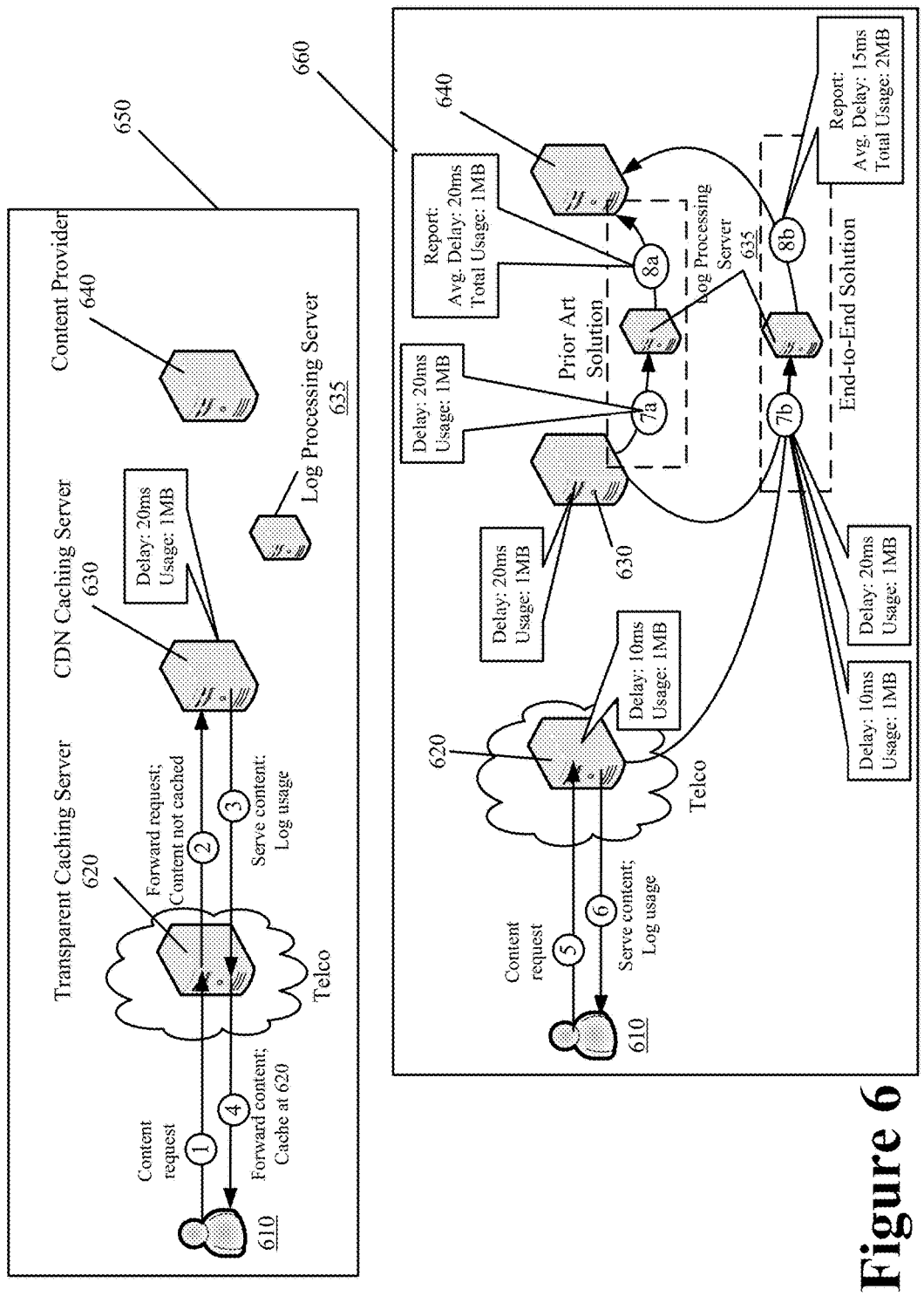
FIG. 6 illustrates the links in the delivery chain that content typically traverses when passing from a CDN to an end user.

FIG. 6 illustrates the links in the delivery chain that content typically traverses when passing from a CDN to an end user. The first link in the delivery chain is the end user 610. The end user 610 operates a network enabled device that requests and receives content from a data network, such as the Internet. The network enabled device can include any computer, smartphone, tablet, personal hotspot, etc. Often, the second link in the delivery chain is at least one transparent caching server 620 that is located in and operated by a Telco, wherein the Telco provides the end user 610 with access to the data network. In this figure, the third link in the delivery chain is a CDN caching server 630. The fourth link in the displayed delivery chain is the content provider customer 640. The figure illustrates a log processing server 635 of the CDN that performs log aggregation, log processing, and performance reporting for the CDN. The figure also illustrates two scenarios 650 and 660 for how content is served to the end user 610 in response to the end user 610 requesting the same content at different times. It should be apparent to one of ordinary skill in the art that the delivery chain being presented in FIG. 6 omits, for purposes of simplicity, other non-caching links in the delivery chain, such as traffic management servers (e.g., DNS servers). Also, the delivery chain may include multiple transparent caching servers and other caching servers, but these servers have been omitted for purposes of simplicity.

In this figure, it is presumed that the content provider customer 640 has exclusively contracted with the CDN to have the CDN deliver the content of the content provider customer 640 on behalf of the content provider customer 640. Accordingly, the content of the content provider customer 640 is cached to the CDN caching server 630.

At 650, the end user 610 issues a first request for content of the content provider customer 640. The request passes through the Telco before passing to the external data network in which the CDN caching server 630 is located. When passing through the Telco, the transparent caching server 620 analyzes the request from the end user 610 and determines whether the request should be intercepted based on whether the transparent caching server 620 has already cached the requested content. At 650, the end user 610 request is the first request for the content of the content provider customer 640 that the transparent caching server 620 receives. Therefore, the content is not cached at the transparent caching server 620 and the request is permitted to pass through the Telco to the external data network, where it is routed to the CDN caching server 630. The CDN caching server 630 responds to the request by serving the requested content to the end user 610 and the CDN caching server 630 logs the network usage associated with serving the content. The content served from the CDN caching server 630 passes back through the Telco to reach the end user 610. In so doing, the content passes through the transparent caching server 620, which caches the content so that it may serve the content upon the next request for that content.

At 660, the end user 610 again requests the content of the content provider customer 640. The transparent caching server 620 monitors the request as it passes through the Telco and the transparent caching server 620 determines that it has the requested content cached, because this is now the second such request for the content. The transparent caching server 620 intercepts the request. As a result, the request is not routed to the CDN caching server 630 and the CDN operator has no knowledge that the content was requested a second time. The transparent caching server 620 responds to the intercepted request by serving the content of the content provider customer 640 from cache and the transparent caching server 620 logs the network usage associated with serving the content.

In the prior art in which the transparent caching server 620 is not assimilated with the CDN, the log processing server 635 generates a report solely based on logs of the CDN caching servers (CDN caching server 630). Such a report notifies the content provider customer 640 that its content was requested once and the CDN details the network usage associated with responding to that one request.

In the federated end-to-end CDN solution of some embodiments in which the transparent caching server 620 is assimilated with the caching servers of the CDN, the log processing server 635 generates a report based on logs that are aggregated from the transparent caching server 620 and the CDN caching server 630. Such a report notifies the content provider customer 640 that its content was requested twice and the CDN is able to detail the network usage associated with responding to both requests for the content provider customer's 640 content. Moreover, the end-to-end solution improves the performance metrics reported by the CDN because of the greater efficiency with which the transparent caching server 620 can respond to end user requests relative to the CDN caching server 630. Consequently, the metrics reported based on the end-to-end CDN solution will show improved performance relative to the solution that does not assimilate the transparent caching server performance with the performance of the CDN caching servers. For example, assume that the delay to serve content from the CDN caching server 630 to the end user 610 is 20 milliseconds (ms) and assume that the delay to serve content from the transparent caching server 620 to the end user 610 is 10 ms. In the prior art implementation in which the transparent caching server 620 is not assimilated with the CDN, the average delay to serve the content of the content provider customer 640 is 20 ms. However in the end-to-end solution of some embodiments in which the transparent caching server 620 is assimilated, the CDN can accurately and correctly report an average delay of 15 ms when the content of the content provider 640 was requested and served twice with the CDN caching server 630 responding to the first request and the transparent caching server 620 responding to the second request. The deficiency in the prior art implementation relative to the federated end-to-end solution presented herein is magnified when content is requested thousands of times and a significant percentage (e.g., greater than 5%) of those requests are intercepted and responded to by various transparent caching servers along the delivery chain.

This deficiency in reporting also presents the secondary purpose for the assimilation of transparent caching servers with the CDN caching servers. This secondary purpose is to use the assimilated transparent caching logs to allow the CDN operator to bill the content provider customer for the end-to-end delivery of the content provider customer's content and the network usage associated with such delivery. Accordingly and with reference back to FIG. 3, the process integrates (at 340) the post-processed transparent caching server log for billing. This integration involves combining the usage identified in the post-processed log with usage that is identified from logs of the caching servers of the CDN, to produce a comprehensive tally of the network usage that is related to the delivery of content of a particular content provider customer of the CDN. The process then bills (at 350) the particular content provider customer for all such network usage.

This secondary purpose is illustrated with reference back to FIG. 6. In the prior art in which the transparent caching server 620 is not assimilated with the CDN, the log processing server 635 only accounts for the network usage that is associated with serving the content from the CDN caching server 630 to the end user 610 when billing the content provider customer 640 for the network usage that is associated with delivering the content provider customer's content 640. The log processing server 635 is unaware of the network usage that the transparent caching server 620 consumes to serve the content provider customer's content in response to the second request issued by the end user 610. For instance in FIG. 6, it is presumed that one megabyte of network usage is consumed to the serve the content of the content provider customer 640. In the prior art scenario, the log processing server 635 bills the content provider customer 640 for the one megabyte of network usage that the CDN caching server 630 consumed to serve the content at 650. However, the content provider customer is not charged for the additional one megabyte that is consumed by the transparent caching server 620 to serve the content at 660. In the end-to-end solution in which the transparent caching server 620 is assimilated with the CDN, the log processing server 635 is aware of the second megabyte of network usage based on assimilation and processing of the transparent caching server 620 log. The log processing server 635 can then bill the content provider customer 640 for two megabytes of network usage instead of only one in the prior art scenario. The CDN is therefore compensated for all network usage that is related to the delivery of the content provider customer's content. As discussed above, the transparent caching server operator is also compensated, either by receiving fixed compensation or variable compensation for providing the CDN access to the transparent caching server log, wherein the fixed compensation is a onetime or recurring fee that is paid to the transparent caching server operator for each log access irrespective of the network usage identified in the log, and wherein the variable compensation is a fee that is paid to the transparent caching server operator based on the network usage that is identified in the accessed log and a percentage of the fee that the CDN operator collects from the content provider customer for the identified network usage in the log.

To further monetize the network usage that is logged to the transparent caching server log, the process may involve optionally redistributing (at 360) the aggregated transparent caching server logs to other CDN operators. In some embodiments, redistributing the aggregated transparent caching server logs involves the CDN operator that has (exclusive or non-exclusive) access to the transparent caching server logs passing the logs to other CDN operators. The other CDN operators then independently process the logs to identify network usage that is related to content of their own content provider customers. These other CDN operators can then bill their content provider customers for the identified network usage. In return, the other CDN operators pay the CDN operator that redistributes the transparent caching server logs a fee for such access. In some embodiments, redistributing the aggregated transparent caching server logs involves the CDN operator that has (exclusive or non-exclusive) access to the transparent caching server logs processing the logs on behalf of other CDN operators. In this manner of redistributing the logs, the actual logs remain in the possession of a single CDN operator. That single CDN operator then identifies network usage that is related to content provider customers of other CDN operators and reports such network usage to the other CDN operators. To do so, the other CDN operators provide a list of identifiers (i.e., an association table) that identify their content provider customers to the CDN operator that has access to the transparent caching server logs, so that the CDN operator can perform the processing of the logs on behalf of the other CDN operators. The other CDN operators can then compensate the CDN operator for performing the processing. For these reasons, it is envisioned that exclusivity in the bilateral agreements established with the transparent caching server operators is valuable to the CDN operator.

Figure 7:
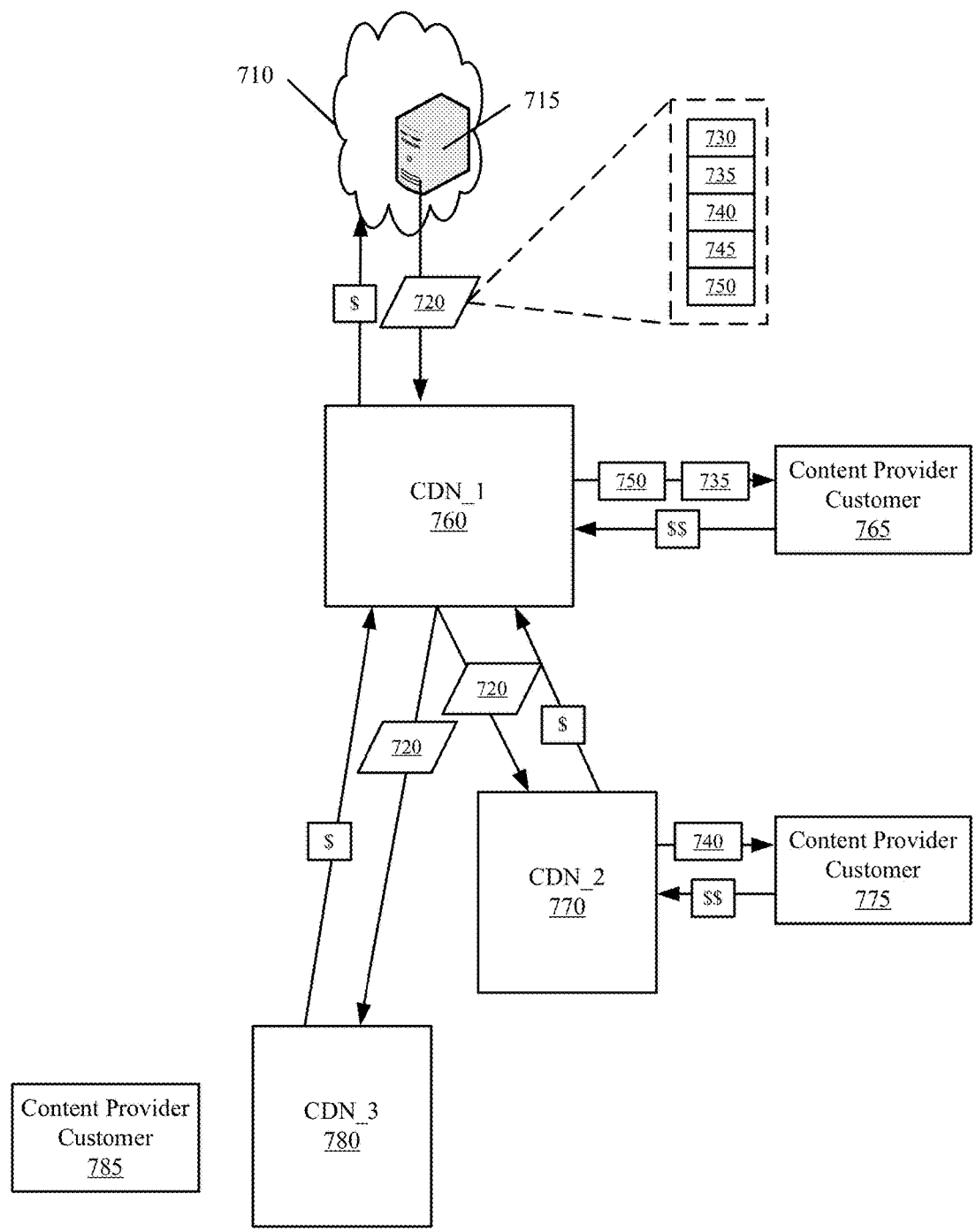
FIG. 7 illustrates how a first CDN operator can further monetize a transparent caching server log by redistributing the transparent caching server log to second and third CDN operators in accordance with some embodiments.

FIG. 7 illustrates how a first CDN operator can further monetize a transparent caching server log by redistributing the transparent caching server log to second and third CDN operators in accordance with some embodiments. The figure depicts a transparent caching server operator 710 that operates a transparent caching server 715, a transparent caching server log 720 with entries 730, 735, 740, 745, and 750, a first CDN operator 760 with content provider customer 765, a second CDN operator 770 with content provider customer 775, and a third CDN operator 780 with content provider customer 785.

The first CDN operator 760 enters into a bilateral agreement with the transparent caching server operator 710. For the purposes of FIG. 7, it is assumed that the bilateral agreement contains an exclusivity clause that provides the first CDN operator 760 exclusive access to the log 720 of the transparent caching server 715 while preventing the second CDN operator 770 and the third CDN operator 780 from obtaining access to the log 720 from the transparent caching server 715 of the transparent caching server operator 710.

The first CDN operator 760 aggregates the log 720 from the transparent caching server 715. The first CDN operator 760 processes the log 720 in accordance with the above described processes and identifies that entries 735 and 750 track network usage that is related to delivering content for the content provider customer 765 of the first CDN operator 760. The first CDN operator 760 bills the content provider customer 765 for such network usage and collects payment from the content provider customer 765. The first CDN operator 760 may bill the content provider customer 765 solely for the network usage that is identified in the log 720 or may bill the content provider customer 765 for the network usage that is identified in the log 720 and the network usage that is identified in the logs that are aggregated from the caching servers that are operated by the first CDN operator 760.

The first CDN operator 760 compensates the transparent caching server operator 715 for granting exclusive access to the log 720. The compensation may include a fixed fee or may be dependent on the payment that the first CDN operator 760 collects from the content provider customer 765 for the network usage that is identified in the log 720.

The first CDN operator 760 then distributes the log 720 to the second CDN operator 770. The second CDN operator 770 processes the log 720 in accordance with the above-described processes. As part of the processing, the second CDN operator 770 identifies that entry 740 in the log 720 tracks network usage that is related to delivering content for the content provider customer 775 of the second CDN operator 770. The second CDN operator 770 incorporates the network usage associated with entry 740 into its performance and statistics reports, wherein the reports can be viewed by the content provider customer 775 to determine demand, various performance metrics, and overall network usage for delivery of the content provider customer's 775 content. Additionally, the second CDN operator 770 uses the identified network usage to bill the content provider customer 775 for the network usage in entry 740 and collects payment from the content provider customer 775. The second CDN operator 770 compensates the first CDN operator 760 for the access to the log 720. The compensation can be a fixed compensation or a variable compensation. A separate bilateral agreement between the first CDN operator 760 and the second CDN operator 770 may set forth the terms and conditions with which the first CDN operator 760 provides the second CDN operator 770 access to the log 720. As part of this agreement, the form and amount of compensation are detailed. Also as part of the agreement, the first CDN operator 760 can prevent the second CDN operator 770 from redistributing the log 720 to any other entity.

The first CDN operator 760 then distributes the log 720 to the third CDN operator 780. The third CDN operator 780 processes the log 720 in accordance with the above-described processes. The third CDN operator 780 identifies that no entries track network usage that is related to delivering content for the content provider customer 785 of the third CDN operator 780. The third CDN operator 780 is thus unable to bill the content provider customer 785 for any network usage in the log 720, but may nevertheless be obligated to pay the first CDN operator 760 a fee for being provided access to the log 720.

In the manner of transparent caching server log redistribution presented in FIG. 7, each CDN operator is able to maintain autonomy and privacy while still obtaining access to the transparent caching server log 720. Specifically, CDN operators can keep content provider customer lists and content provider customer identifiers internal and not expose them to other CDN operators. By redistributing the log to different CDN operators, each receiving CDN operator can independently process the log 720 to identify the network usage for its content provider customers. Unidentified network usage will be of no value to the CDN operator.

As noted above and in accordance with some embodiments, the first CDN operator with exclusive access to the log 720 can redistribute the network usage in the log 720 without providing other CDN operators access to the log 720. This is accomplished by entering into a bilateral agreement with a second CDN operator, whereby the second CDN operator agrees to provide the first CDN operator an association table with various identifiers for content provider customers of the second CDN operator. The first CDN operator then processes the log to identify network usage that relates to its own content provider customers while also identifying network usage that relates to content provider customers of the second CDN operator. The first CDN operator then passes the identified network usage for the content provider customers of the second CDN operator to the second CDN operator. The second CDN operator can incorporate the identified network usage into its reports and can use the identified network usage to bill the corresponding content provider customers for the network usage. In this manner, the second CDN operator is never provided access to the transparent caching server logs, but is still able to benefit from the logs by having the first CDN operator identify the network usage for content provider customers of the second CDN operator on behalf of the second CDN operator.

The foregoing sets forth an end-to-end CDN solution that requires no change to the existing operation of the transparent caching servers or the CDN caching servers when assimilating the transparent caching server logs in the reporting and billing functionality of the CDN. Such embodiments may be preferred when the transparent caching servers being assimilated are from different manufacturers. More specifically, the operation of the transparent caching servers from the different manufactures is likely to not be not standardized and therefore, specific functionality that may otherwise be needed to facilitate their assimilation into the CDN may be absent from one or more of the transparent caching servers.

However, various advantages can be realized when the transparent caching servers are enhanced such that their operation provides functionality in support of the end-to-end CDN solution. These enhancements, when implemented, can reduce the processing overhead of the log processing server in determining which entries of the aggregated transparent caching server logs track network usage for content provider customers of the CDN operator. These enhancements can also enable more intelligent caching at the transparent caching servers such that caching of CDN customer content is prioritized over other content. In so doing, the delivery of the CDN customer content is better accelerated and the transparent caching server operator better monetizes on the content that is delivered by the transparent caching servers under its control.

In some embodiments, the enhancements include (1) the introduction of CDN keys in packets disseminated by the CDN caching servers, (2) the logging of the CDN keys by the transparent caching servers, and (3) the processing of the CDN keys by the log processing server as part of the reporting and billing function of the CDN. The CDN keys are encoded or hashed values that uniquely identify the content provider customers of a CDN or, more granularly, different content of the different content provider customers of a CDN. The CDN keys are embedded in the header fields of the transmitted packets.

The CDN keys for the different content provider customers of a CDN can be generated by the CDN caching servers or by a central server such as the log processing server of the CDN using one or more hashing functions. The hashing functions accept a name or other identifier (e.g., URL, domain name, etc.) of the CDN content provider customer as input, hash the input, and produce a unique integer value as output that serves as the CDN key. To identify specific content of a CDN content provider customer as a unique integer value, the hashing functions accept a name or other identifier of the CDN content provider customer and name or other identifier of the content as input, hash the input, and produce a unique integer value that represents content of the CDN customer. When using the CDN keys, the association table can be simplified to provide a mapping between the CDN keys and the customers or customer content that they represent.

The CDN keys are introduced within the header fields of the content disseminated from the CDN caching servers through the transparent caching servers en route to the end users requesting the content. Preferably, the CDN keys are embedded within the layer 7 or application layer header of the packets encapsulating the content. For instance, a CDN key for a specific CDN content provider customer can be introduced within the HTTP header of the packet encapsulating the content of that specific CDN content provider customer. The CDN keys may be introduced in an optional header field, as a non-standard header field, within a required but unused header field, or as part of a parameter of a required header field.

As a result of introducing the CDN keys, a transparent caching server that is enhanced to identify the new CDN keys can readily distinguish CDN customer content from other content. For instance, when a CDN caching server serves the same content as another server through a transparent caching server, the transparent caching server can readily distinguish the content served by the CDN caching server from the content served by the other server based on the presence of the CDN key. The enhancement to the transparent caching server enables the transparent caching server to more intelligently manage its cache. Specifically, the transparent caching server can prioritize the caching of the CDN customer content over other content and prevent or delay the removal of CDN customer content from cache. This results in better accelerated delivery of the CDN customer content. This also results in the transparent caching server serving more CDN customer content and in turn, results in better monetization as the CDN compensates the transparent caching server operator for the delivery of CDN customer content and no compensation is otherwise provided for the delivery of other content.

Figure 8:
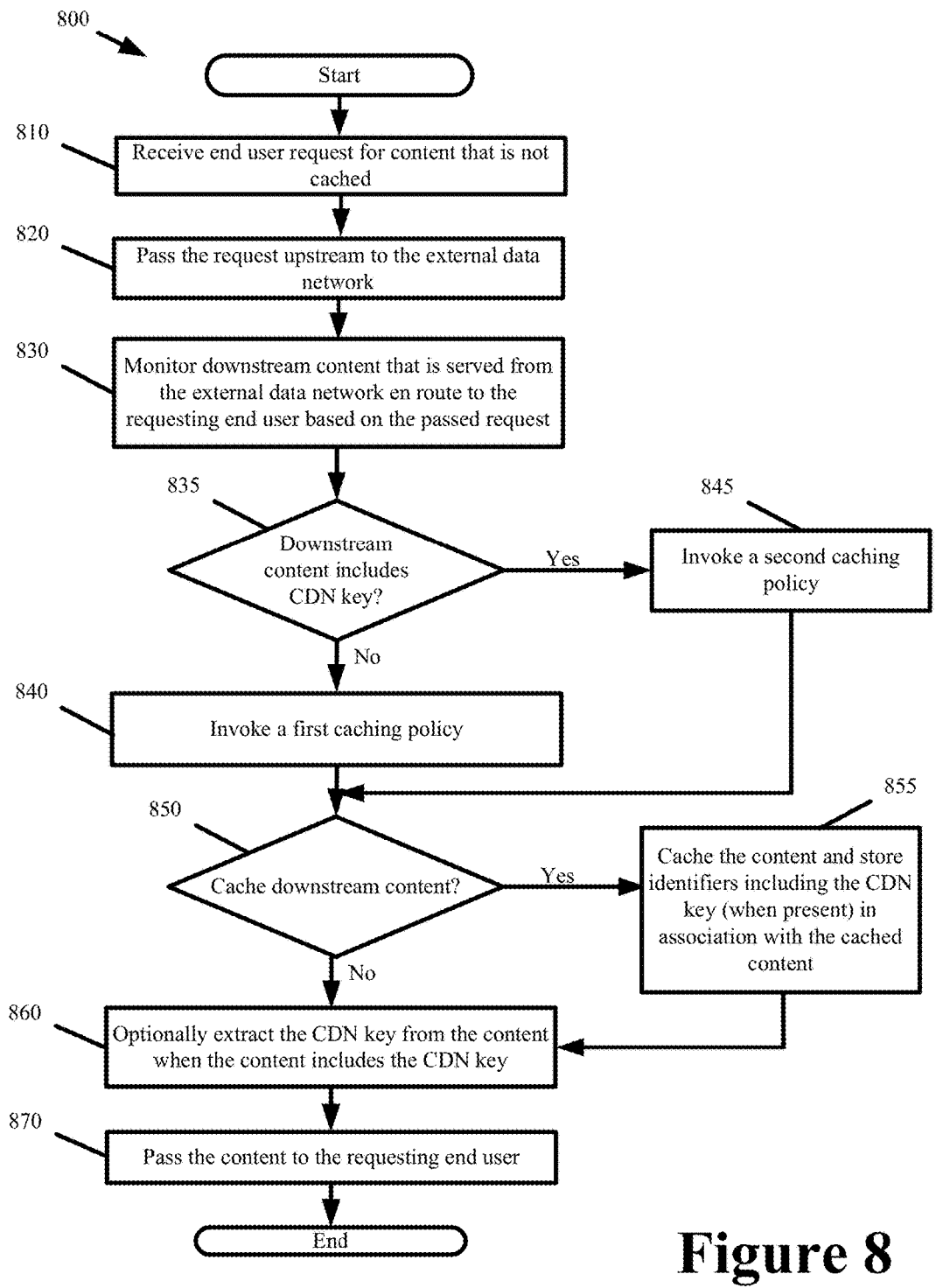
FIG. 8 presents a process that is performed by an enhanced transparent caching server to utilize the CDN keys in support of the end-to-end CDN solution.

FIG. 8 presents a process 800 that is performed by an enhanced transparent caching server to utilize the CDN keys in support of the end-to-end CDN solution. The process commences when the enhanced transparent caching server receives (at 810) an end user request for content that is not cached at the enhanced transparent caching server. As with non-enhanced operation, the process does not intercept the request and allows the request to pass (at 820) upstream to the external data network. In some embodiments, the process involves intercepting the request and reissuing the request such that it appears to have originated from the enhanced transparent caching server. The process then receives and monitors (at 830) the downstream content that is served from the external data network in reply to the request. Specifically, the monitoring determines (at 835) whether the downstream content includes a CDN key by analyzing the headers of the downstream content.

When the content does not include a CDN key, the process invokes (at 840) a first caching policy. The first caching policy controls whether the transparent caching server caches the content before passing it through to the requesting end user or whether the transparent caching server passes the content through without caching.

When the content includes a CDN key, the process invokes (at 845) a second caching policy. Like the first caching policy, the second caching policy controls whether the transparent caching server caches the content before passing it through to the requesting end user or whether the transparent caching server passes it through without caching. However, the second caching policy is provided priority over the first caching policy. This ensures that the cache of the transparent caching server is primarily allocated to caching content that is associated with a CDN key (i.e., CDN customer content) and secondarily allocated to caching other content. Should the cache be full, the caching policies will cause CDN customer content to be retained while other content is replaced (unless the cached CDN customer content has become stale). In many instances, the second caching policy will be a first hit caching policy. Also, the second caching policy can be implemented as a granular caching policy, whereby different degrees of priority are provided based on the CDN content provider customer or content that is identified by the CDN key. In this manner, content of some CDN customers can be given priority over content of other CDN customers. For example, it may be that a specific CDN customer is providing a live stream of a highly popular event. Therefore, the second caching policy may be modified so that the CDN key identifying the popular content is stored to cache upon the first request and retained in cache for a specified duration while other CDN customer content is cached upon the second request and replaced from cache when the cache becomes full.

Next, the process determines (at 850), based on the invoked caching policy, whether the content should be cached before passing to the requested end user. If not, the process optionally extracts (at 860) the CDN key from the content when the content includes the CDN key, the process passes (at 870) the content to the requesting end user, and the process ends. The extracting of the CDN key prevents the requesting end user (that receives the content) from having any knowledge of the CDN key. In some embodiments, the extraction of the CDN key is not performed as it will likely be ignored by the end user receiving the content. If the process determines (at 850) that the content should be cached, then the process caches (at 855) the content and stores the various identifiers including the CDN key when it is present. The process then optionally performs (at 860) the CDN key extraction before passing (at 870) the content to the requesting end user and then the process ends.

Subsequently, when a request for cached content is received at the enhanced transparent caching server, the server will intercept the request and serve the requested content out of cache. The transparent caching server will log the data network usage that is associated with serving the requested content. Additionally, the transparent caching server will include a CDN key with the logged data network usage if the CDN key was associated with the served cached content or if the content being served is CDN customer content. Including the CDN key in the transparent caching serve log simplifies log processing at the log processing server, because the log processing server can readily identify transparent cache server log entries that relate to the delivery of CDN customer content from other content by identifying entries that include a CDN key. Additionally, inclusion of the CDN key avoids any confusion as to whether a CDN customer is to be charged for the content delivery provided by the transparent caching server when that CDN customer has other servers besides the CDN caching servers serving some or all of the CDN customer's content.

During log processing, the log processing server aggregates the logs from the enhanced transparent caching servers. The log processing server integrates the data network usage from the transparent caching server logs with the data network usage of the CDN caching server logs by matching log entries that have the same CDN key. The log processing server can then perform a reverse hash or perform a lookup into the association table to determine which one or more CDN keys represent which one or more CDN content provider customers in order to report and bill for the total network data usage by each such CDN customer.

Further enhancements can be made to the operation of the transparent caching servers to seamlessly assimilate the transparent caching servers as extended PoPs of the CDN. These enhancements resolve issues with respect to how to attribute performance metrics derived from content served by the transparent caching servers to the transparent caching servers instead of intermixing those metrics with those derived from the content served by the CDN caching servers.

Figure 9:
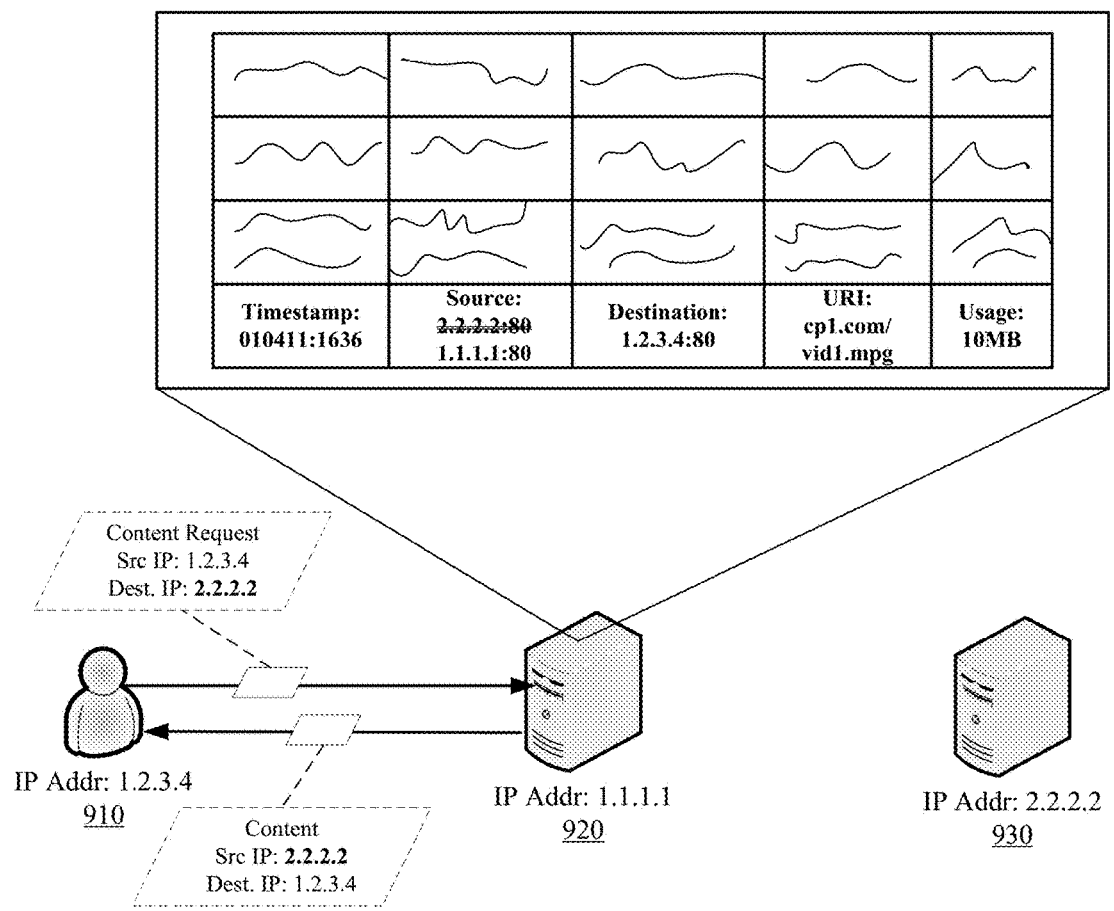
FIG. 9 illustrates assimilating a transparent caching server as an extended PoP of the CDN in accordance with some embodiments.

FIG. 9 illustrates assimilating a transparent caching server as an extended PoP of the CDN in accordance with some embodiments. This figure includes an end user 910, the transparent caching server 920, and a CDN caching server 930. For exemplary purposes, the transparent caching server 920 is assigned IP address 1.1.1.1 and the CDN caching server 930 is assigned IP address 2.2.2.2.

As shown, the transparent caching server 920 intercepts a request that is intended for the CDN caching server 930. The transparent caching server 920 has the requested content cached. Therefore, rather than pass the request to the CDN caching server 930, the transparent caching server 920 serves the requested content from cache. The end user 910 is unaware that the content is served by the transparent caching server 920 and not the CDN caching server 930, because the transparent caching server emulates the CDN caching server 930 by inserting the IP address of the CDN caching server 930 in the source IP address field of the packets that are sent from the transparent caching server 920 to the end user 910.

When logging the data network usage that is associated with the delivered content, the transparent caching server

920 would normally populate the log using the same parameters as those used to deliver the content. Specifically, the source IP address would be that of the CDN caching server 930. However, during log processing, the emulated IP address would lead to improperly attributing the content delivery and any derived performance metrics to the CDN caching server 930 and not the transparent caching server 920. Accordingly, to seamlessly assimilate the transparent caching server 920 as an extended PoP of the CDN, the operation of the transparent caching server 920 is enhanced so that when the transparent caching server 920 logs data network usage, it inserts its own IP address as the source IP address instead of the emulated IP address. The transparent caching server 920 may also insert a CDN key as part of the log entry if one is associated with the content that was served. As a result, when the log processing server aggregates a log from the transparent caching server 920, the log processing server can generate reports for the CDN content provider customers that illustrate the transparent caching server 920 as an extended PoP and that present data network usage and performance metrics for the extended PoP.

In some embodiments, transparent caching servers can be assimilated as extended PoPs of the CDN without enhancing the operation of the transparent caching servers. In some such embodiments, the log processing server tags each log that it aggregates from a transparent caching server with the IP address of the transparent caching server. Prior to log processing, the source IP address fields within the aggregated transparent caching server log are replaced with the tagged IP address of the transparent caching server. Once replaced, the log processing server can correctly attribute network usage and performance metrics to the extended PoP represented by the transparent caching server rather than the PoP of a CDN caching server or other origin server that is emulated by the transparent caching server.

Thusfar, the end-to-end solution has been described relative to an implementation model that involves a CDN operator and a transparent caching server operator. However, some embodiments of the end-to-end CDN solution may be implemented by an alternative model that involves a CDN operator, a broker, and one or more transparent caching server operators.

In some embodiments, transparent caching server operators enter into a bilateral agreement with the broker instead of a CDN operator. The broker secures (exclusive or non-exclusive) access to transparent caching server logs of one or more transparent caching server operators. The broker then acts as a reseller that sells access to the transparent caching server logs on behalf of the transparent caching server operators. Such a scenario may be preferred when a transparent caching server operator is small in scope. Specifically, when a transparent caching server operator operates only one or a few transparent caching servers, the transparent caching server operator will have little value to offer a CDN operator. In other words, one or a few transparent caching server logs may not provide the CDN operator enough value to compensate the transparent caching server operator for access to those few logs. However, a broker can first enter into bilateral agreements with several transparent caching server operators. When the broker has access to a large bundle of transparent caching server logs (e.g., more than fifty), the broker can negotiate terms with one or more CDN operators to sell access to the entire bundle of transparent caching server logs.

Figure 10:
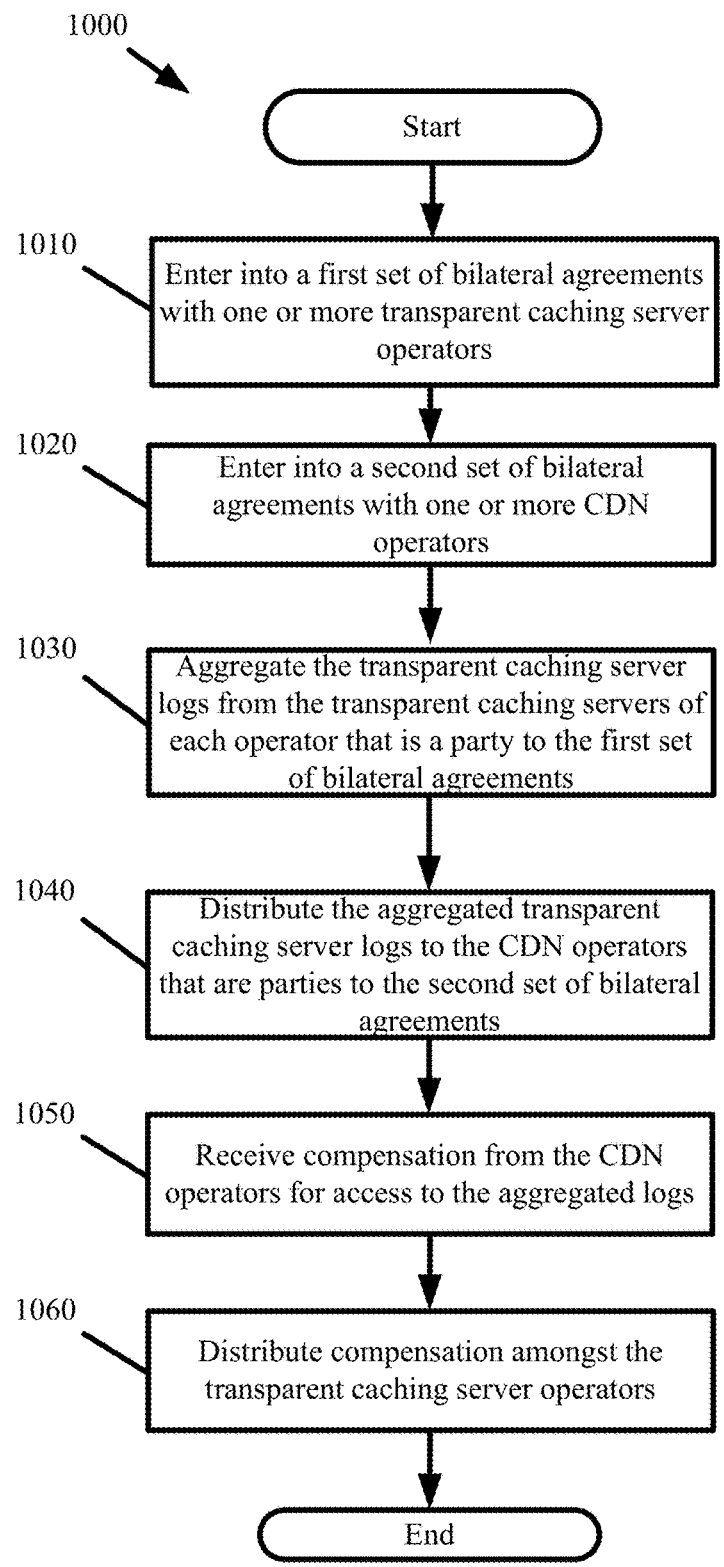
FIG. 10 presents a process performed by a broker acting as a reseller of transparent caching server logs in accordance with some embodiments.

FIG. 10 presents a process 1000 performed by a broker acting as a reseller of transparent caching server logs in accordance with some embodiments. The process 1000 commences with the broker entering (at 1010) into a first set of (exclusive or non-exclusive) bilateral agreements with one or more transparent caching server operators that collectively operate a large number of transparent caching servers. For instance, the broker may enter into a first bilateral agreement with a first transparent caching server operator that operates two transparent caching servers and a second bilateral agreement with a second transparent caching server operator that operates fifteen transparent caching servers. As part of the bilateral agreements entered into at 1010, the broker agrees to compensate each transparent caching server operator that is a party to a bilateral agreement with the broker some monetary fee in return for providing the broker access to the logs of the transparent caching servers that are under the control of the operator. The compensation may vary per transparent caching server operator based on the overall contribution to the entire bundle of transparent caching server logs by a particular operator.

The process continues with the broker entering (at 1020) into a second set of bilateral agreements with one or more CDN operators. As part of the second set of bilateral agreements entered into at 1020, the broker agrees to provide the CDN operators that are parties to the second set of bilateral agreements access to the full set or substantial set of transparent caching server logs that the broker has obtained access to as a result of the first set of bilateral agreements. In return, the CDN operators agree to compensate the broker for such access.

The process aggregates (at 1030) the transparent caching server logs from the transparent caching servers of each operator that is a party to the first set of bilateral agreements. The broker may optionally format the aggregated logs to produce a unified format for the logs. Also, the broker may optionally combine the entries from each of the aggregated logs into a single log. The process then distributes (at 1040) the aggregated transparent caching server logs to the CDN operators that are parties to the second set of bilateral agreements. The CDN operators can process the logs to identify network usage for their content provider customers. The process receives (at 1050) compensation from the CDN operators for access to the aggregated set of transparent caching server logs. The process distributes (at 1060) some or all of the received compensation amongst the transparent caching server operators. The compensation may be distributed based on each transparent caching server's contribution to the bundle of aggregated logs. For example, an operator that provides access to ten transparent caching server logs may be compensated ten times as much as an operator that provides access to a single transparent caching server log. In some embodiments, the compensation is more granular. For example, the transparent caching server operators are compensated based on the number of total entries from the logs aggregated from servers of the operators. Consequently, operators of transparent caching servers that serve large amounts of content that the CDNs are contracted to serve are compensated greater than operators of transparent caching servers that serve other content that the CDNs are not contracted to server.

In some embodiments, the broker does not distribute the aggregated logs to the CDN operators. Instead as part of the second set of bilateral agreements, the CDN operators provide identifiers (i.e., association tables) for their content provider customers to the broker. The broker then processes the aggregated logs on behalf of the CDN operators. The network usage that is identified for content provider customers of a particular CDN operator as a result of the processing is then passed to that particular CDN operator in return for some amount of compensation. In this manner, the broker can charge the CDN operators a variable fee for the network usage that is identified in the aggregate set of logs, while also compensating each transparent caching server operator a variable fee for the total amount of network usage that is related to delivering content for content provider customers of various CDN operators.

The end-to-end CDN solution described thus far promotes a federated CDN in which one CDN operator is able to leverage resources of third parties in order to improve its content delivery capabilities. The preceding description and figures describe a federated CDN wherein the third parties participating in the federation include transparent caching server operators. In some embodiments, the participants to the federation may additionally include other CDN operators, such that a first CDN operator can use resources of a second CDN operator and a transparent caching server operator to perform improved content delivery.

Figure 11:
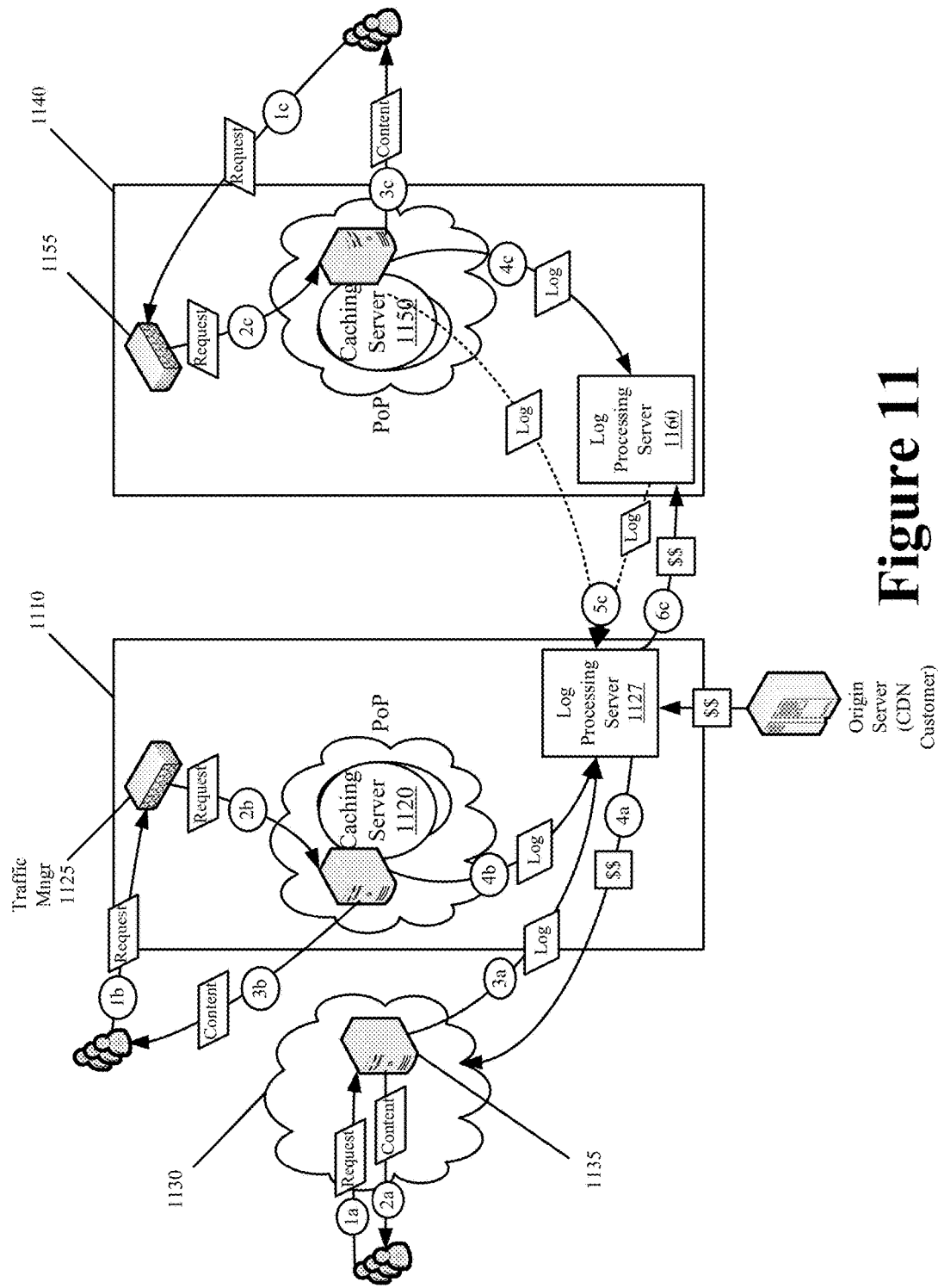
FIG. 11 illustrates a fully federated CDN wherein a first CDN operator assimilates resources of a transparent caching server operator and resources of a second CDN operator in accordance with some embodiments.

FIG. 11 illustrates a fully federated CDN, wherein a first CDN operator assimilates resources of a transparent caching server operator and resources of a second CDN operator in accordance with some embodiments. The first CDN operator 1110 independently operates a set of caching servers 1120, traffic management server 1125, and a log processing server 1127. The transparent caching server operator 1130 independently operates transparent caching server 1135. The second CDN operator 1140 independently operates a set of caching servers 1150, traffic management server 1155, and a log processing server 1160.

As part of the federation, the first CDN operator 1110 is permitted to leverage the content delivery capabilities of the transparent caching server 1135 and the set of caching servers 1150 of the second CDN operator 1140 in order to deliver content for content provider customers of the first CDN operator 1110. To do so, a first bilateral agreement is established between the first CDN operator 1110 and the transparent caching server operator 1130 in the manner described above and a second bilateral agreement is established between the first CDN operator 1110 and the second CDN operator 1140. The second bilateral agreement is one that permits the first CDN operator 1110 to place content for one or more of its content provider customers on one or more of the set of servers 1150 that is operated by the second CDN operator 1140, so that such content is served from the set of servers 1150 in addition to or instead of being served from the set of servers 1120. Specifically, the first CDN operator 1110 purchases unused bandwidth from the second CDN operator 1140 for its own usage. The second CDN operator 1140 then reports network usage and other performance metrics back to the first CDN operator 1110, so that the first CDN operator 1110 can bill its content provider customers accordingly. Further description for federating two or more CDNs is provided in the United States provisional patent application with Ser. No. 61/524,294 entitled "Open Content Delivery Network Platform with Capacity Exchange".

As shown, the log processing server 1127 of the first CDN operator 1110 aggregates logs from the set of caching servers 1120 that is operated by the first CDN operator 1110, the transparent caching server 1135, and the set of caching servers 1150 that is operated by the second CDN operator 1140. In some embodiments, the log processing server 1127 aggregates the logs of the set of caching servers 1150 from the log processing server 1160 of the second CDN operator 1140.

The log processing server 1127 processes the aggregated logs to identify total network usage by a content provider customer of the first CDN operator 1110. In this federated CDN, the total network usage can account for content of the content provider customer that is delivered by the one or more of the set of caching servers 1120, the transparent caching server 1135, and the set of servers 1150. The first CDN operator 1110 compensates each of the transparent caching server operator 1130 and the second CDN operator 1140 for providing access to the logs.

III. Server System

Many of the above-described processes and components are implemented as software processes that are specified as a set of instructions recorded on non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense and may include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Further, wherever a server is identified as a component of the embodied invention, it is understood that the server may be a single physical machine, or a cluster of multiple physical machines performing related functions, or virtualized servers co-resident on a single physical machine, or various combinations of the above.

Figure 12:
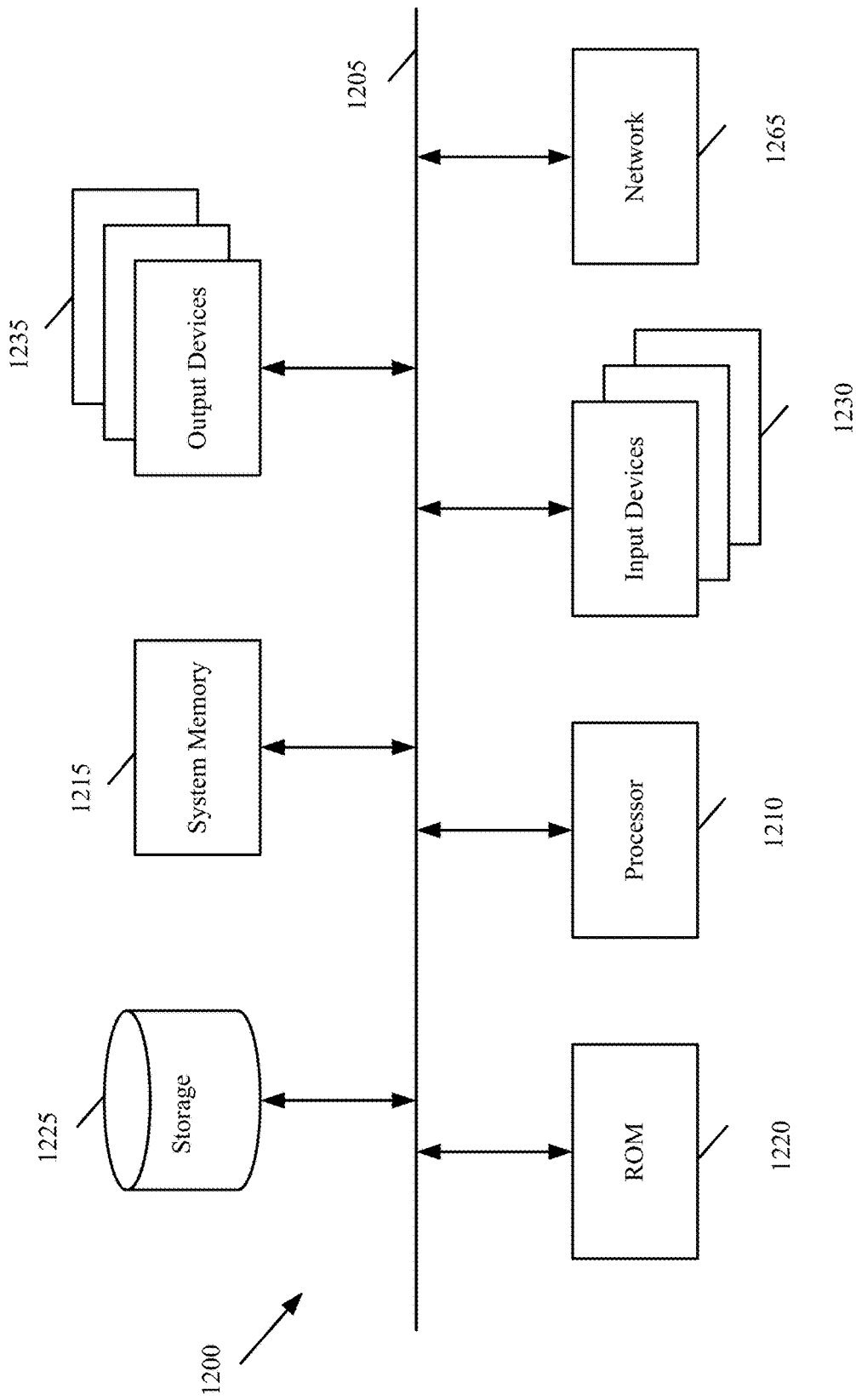
FIG. 12 illustrates a computer system or server with which some embodiments are implemented.

FIG. 12 illustrates a computer system or server with which some embodiments are implemented. Such a computer system includes various types of computer readable mediums and interfaces for various other types of computer-readable mediums that implement the processes for the end-to-end CDN solution described above (e.g., the transparent caching server, CDN caching server, and log processing server). Computer system 1200 includes a bus 1205, a processor 1210, a system memory 1215, a read-only memory 1220, a permanent storage device 1225, input devices 1230, and output devices 1235.

The bus 1205 collectively represents all system, peripheral, and chipset buses that communicatively connect the numerous internal devices of the computer system 1200. For instance, the bus 1205 communicatively connects the processor 1210 with the read-only memory 1220, the system memory 1215, and the permanent storage device 1225. From these various memory units, the processor 1210 retrieves instructions to execute and data to process in order to execute the processes of the invention. The processor 1210 is a processing device such as a central processing unit, integrated circuit, graphical processing unit, etc.

The read-only-memory (ROM) 1220 stores static data and instructions that are needed by the processor 1210 and other modules of the computer system. The permanent storage device 1225, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1225.

Other embodiments use a removable storage device (such as a flash drive) as the permanent storage device Like the permanent storage device 1225, the system memory 1215 is a read-and-write memory device. However, unlike the storage device 1225, the system memory is a volatile read-and-write memory, such as random access memory (RAM). The system memory stores some of the instructions and data that the processor needs at runtime. In some embodiments, the processes are stored in the system memory 1215, the permanent storage device 1225, and/or the read-only memory 1220.

The bus 1205 also connects to the input and output devices 1230 and 1235. The input devices enable the user to communicate information and select commands to the computer system. The input devices 1230 include, but are not limited to, alphanumeric keypads (including physical keyboards and touchscreen keyboards) and pointing devices (also called "cursor control devices"). The input devices 1230 also include audio input devices (e.g., microphones, MIDI musical instruments, etc.). The output devices 1235 display images generated by the computer system. The output devices include, but are not limited to, printers and display devices, such as cathode ray tubes (CRT) or liquid crystal displays (LCD).

Finally, as shown in FIG. 12, bus 1205 also couples computer 1200 to a network 1265 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1200 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for extending operation of a content delivery network (CDN) with a transparent caching server, the method comprising:
   inspecting, by the transparent caching server, (i) content passing over a digital network through the transparent caching server en route to a plurality of end users and (ii) end user requests passing from the plurality of end users over the digital network through the transparent caching server, the transparent caching server comprising a microprocessor and a memory storing cached copies of said content and a log;
   caching, by the transparent caching server, a first subset of said content to the memory according to a first caching policy, wherein the first subset of content omits a CDN key, the CDN key identifying content the CDN serves on behalf of a CDN customer;
   serving, by the transparent caching server, cached copies of the first subset of content from said memory to the plurality of end users over the digital network in response to a first subset of the end user requests;
   logging, by the transparent caching server, a first set of data network usage resulting from said serving the cached copies of the first subset of content, wherein logging the first set of data network usage comprises tracking the first set of data network usage without the CDN key as a first set of entries of the log;
   determining, by the transparent caching server, that the memory is full;
   based on the determination that the memory is full, caching, by the transparent caching server, a second subset of said content to the memory according to a different second caching policy with priority over the first caching policy, by replacing cached copies of the first subset of content in the memory with the second subset of content, the second subset of content comprising the CDN key;
   replacing, by the transparent caching server, a source Internet Protocol (IP) address in data packets containing cached copies of the second subset of content from a first IP address of the transparent caching server to a second IP address belonging to one CDN caching server of a set of CDN caching servers;
   serving, by the transparent caching server, said data packets containing the cached copies of the second subset of content to the plurality of end users over the digital network with the second IP address as the source IP address of the data packets;
   logging, by the transparent caching server, a second set of data network usage resulting from serving cached copies of the second subset of content with the first IP address of the transparent caching server instead of the second IP address used in said serving the caching copies of the second subset of content, wherein logging the second set of data network usage comprises tracking the second set of data network usage with the CDN key to a second set of entries of the log; and,
   providing, by the transparent caching server, said log comprising the first and second set of entries to the CDN.

2. The method of claim 1, wherein providing said log comprises providing the second set of data network usage from the second set of entries.

3. The method of claim 1, wherein said inspecting comprises inspecting headers of packets encapsulating the first subset of content and the second subset of content, and detecting the CDN key in the second subset of content.

4. The method of claim 1, wherein the CDN key identifies a particular customer of the CDN with a hash value.

5. The method of claim 1, wherein caching the second subset of content according to the second caching policy comprises removing the first subset of content from cache in response to cache utilization of said memory exceeding a particular amount.

6. The method of claim 5, wherein caching the first subset of content according to the first caching policy comprises retaining the second subset of content in cache and replacing previously cached copies of the first subset of content from cache in response to cache utilization of the memory exceeding the particular amount.

7. The method of claim 1 further comprising configuring the transparent caching server with the second IP address.

8. The method of claim 1 further comprising extracting the CDN key from the second subset of content when serving the cached copies of the second subset of content.

9. The method of claim 1 further comprising determining network usage consumed in delivering CDN customer content from a Point-of-Presence (PoP) of the CDN by incorporating the second set of data network usage from the second set of entries of the log and by incorporating data network usage from the set of CDN caching servers.

10. The method of claim 1 further comprising billing a CDN customer based on the second set of data network usage from the second set of entries of the log.

11. The method of claim 1 further comprising storing a plurality of unique CDN keys to said memory, wherein each unique CDN key of the plurality of unique CDN keys uniquely identifies a different CDN customer of a plurality of CDN customers.

12. The method of claim 1 further comprising receiving compensation from the CDN based on the second set of data network usage from the second set of entries of the log.

13. The method of claim 1 further comprising establishing an agreement with the CDN, said agreement providing the CDN access to the log of the transparent caching server in return for compensation by the CDN.

14. The method of claim 1 further comprising assimilating CDN customer data network usage from the second set of entries with CDN customer data network usage from the set of CDN caching servers.

15. The method of claim 1 further comprising intercepting a request from a particular end user to the CDN by the transparent caching server.

* * * * *